US009966658B2

United States Patent
Fitz-Coy et al.

(10) Patent No.: US 9,966,658 B2
(45) Date of Patent: May 8, 2018

(54) ANTENNAS FOR SMALL SATELLITES

(71) Applicant: UNIVERSITY OF FLORIDA RESEARCH FOUNDATION, INC., Gainesville, FL (US)

(72) Inventors: Norman G. Fitz-Coy, Gainesville, FL (US); Vivek Shirvante, San Diego, CA (US); Shawn Johnson, Gainesville, FL (US); Kathryn Cason, Huntsville, AL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 194 days.

(21) Appl. No.: 14/407,396

(22) PCT Filed: Jun. 11, 2013

(86) PCT No.: PCT/US2013/045130
§ 371 (c)(1),
(2) Date: Dec. 11, 2014

(87) PCT Pub. No.: WO2013/188368
PCT Pub. Date: Dec. 19, 2013

(65) Prior Publication Data
US 2015/0162656 A1     Jun. 11, 2015

Related U.S. Application Data

(60) Provisional application No. 61/658,167, filed on Jun. 11, 2012.

(51) Int. Cl.
*H01Q 1/28* (2006.01)
*H01Q 19/10* (2006.01)
(Continued)

(52) U.S. Cl.
CPC ............. *H01Q 1/288* (2013.01); *B64G 1/105* (2013.01); *B64G 1/222* (2013.01); *B64G 1/443* (2013.01);
(Continued)

(58) Field of Classification Search
CPC ........ H01Q 9/30; H01Q 1/288; H01Q 19/106; B64G 1/503
(Continued)

(56) References Cited

U.S. PATENT DOCUMENTS 4,771,293 A    9/1988   Williams et al.
5,618,012 A    4/1997   Lehner et al.
(Continued)

FOREIGN PATENT DOCUMENTS

JP    2003-276699 A    10/2003
JP    2008-221876 A    9/2008
(Continued)

OTHER PUBLICATIONS

International Searching Authority, International Search Report and Written Opinion for International Application No. PCT/US2013/045130, dated Oct. 18, 2014, 13 pages, Korean Intellectual Property Office, Republic of Korea.
(Continued)

*Primary Examiner* — Dameon E Levi
*Assistant Examiner* — Hasan Islam
(74) *Attorney, Agent, or Firm* — Alston & Bird LLP

(57) ABSTRACT

Various embodiments of the present invention include assemblies and methods for utilizing antennas with high gain in small satellites. In one embodiment, a satellite comprising a payload configured for transmitting data is provided. The payload may include various components of the satellite, such as the attitude control system, electrical power system, and/or communication system. The satellite
(Continued)

may be configured to communicate with one or more ground stations. The satellite includes a support structure comprising at least one deployable panel, wherein the support structure houses the payload. The satellite also includes at least one antenna coupled to the support structure, wherein the deployable panel is configured to cover the antenna in a non-deployed state and to expose the antenna in a deployed state.

26 Claims, 33 Drawing Sheets

(51) Int. Cl.
  *B64G 1/66* (2006.01)
  *B64G 1/10* (2006.01)
  *B64G 1/22* (2006.01)
  *B64G 1/44* (2006.01)
  *H01Q 9/30* (2006.01)
(52) U.S. Cl.
  CPC ............ *B64G 1/66* (2013.01); *H01Q 19/106* (2013.01); *H01Q 9/30* (2013.01)
(58) Field of Classification Search
  USPC .................................. 343/915, 916, 880–882
  See application file for complete search history.

(56) References Cited

U.S. PATENT DOCUMENTS

| | | | | |
|---|---|---|---|---|
| 5,666,128 A | * | 9/1997 | Murray | H01Q 1/288 343/705 |
| 5,806,800 A | * | 9/1998 | Caplin | B64G 1/503 165/41 |
| 5,870,063 A | * | 2/1999 | Cherrette | B64G 1/1007 342/354 |
| 5,927,654 A | * | 7/1999 | Foley | B64G 1/222 244/172.6 |
| 6,195,067 B1 | * | 2/2001 | Gilger | H01Q 1/288 343/912 |
| 6,424,314 B1 | | 7/2002 | Baghdasarian et al. | |
| 7,079,079 B2 | * | 7/2006 | Jo | H01Q 1/243 343/700 MS |
| 7,764,236 B2 | * | 7/2010 | Hill | H01Q 1/243 343/702 |
| 2004/0196203 A1 | * | 10/2004 | Lier | H01Q 1/081 343/824 |
| 2008/0143636 A1 | * | 6/2008 | Couchman | B64G 1/66 343/915 |

FOREIGN PATENT DOCUMENTS

| | | |
|---|---|---|
| WO | WO 2010/135421 A2 | 11/2010 |
| WO | WO 2011/041503 A2 | 4/2011 |
| WO | WO 2012/009198 A2 | 1/2012 |

OTHER PUBLICATIONS

Cason, K., et al., "A Nano-Satellite Constellation for Advanced Fire Detection", Proceedings of The American Institute of Aeronautics and Astronautics (AIAA) Reinventing Space Conference, May 7-10, 2012, Los Angeles, California.

Shirvante, Vivek, et al., "Configuration of 3U CubeSat Structures for Gain Improvement of S-band Antennas", Proceedings of 26th Annual AIAA/USU Conference on Small Satellites, Aug. 13-16, 2012, Utah State University in Logan, Utah.

* cited by examiner

ANTENNAS FOR SMALL SATELLITES

CROSS REFERENCE TO RELATED APPLICATIONS

This application is a National Stage application, filed under 35 U.S.C. § 371, of International Application PCT/US2013/045130 filed Jun. 11, 2013, which claims priority to U.S. Application No. 61/658,167 filed Jun. 11, 2012, both of which are hereby incorporated by reference in their entireties.

FIELD OF THE INVENTION

Embodiments of the present invention relate to antennas and, more particularly, to antennas for use in small satellites.

BACKGROUND

Some satellites, such as nano- and pico-satellites in low earth orbits, unlike their larger counterparts, have more stringent limitations on antenna design due to power constraints that govern the operational frequency and size that defines the space constraints. For high bandwidth applications, higher frequencies with higher transmission power may be used with wide band high gain antenna. Transmission power for a satellite can be reduced by utilizing high gain antennas, but at the cost of additional space. However, due to space and power limitations in small satellites, such options to increase gain on antennas is less desirable. Thus, there is a need for an improved system that provides for higher gain in antennas for small satellites without the increase in power or space requirements.

SUMMARY OF THE INVENTION

Some embodiments of the present invention are directed to high gain antennas that exploit the structure of a satellite. For example, a satellite may be equipped with one or more deployable solar panels and designed to be in a low drag configuration by operating outside of a passive gravity gradient using attitude control. A satellite with body-mounted solar panels may be limited in power production due to the limited surface area receiving sunlight at a particular attitude. For high power missions, however, deployable solar panels can be utilized to maximize the surface area receiving sunlight. The deployable structure may be a conductive material that acts as a ground or a reflector depending on the antenna configuration. However, the reflector panel may be a non-conductive material in an alternative embodiment.

In comparison to a monopole with a gain of about 1.65 dB used in a conventional Cubesat application at higher frequencies, a monopole packaged according to some embodiments of the present invention provides a gain up to about 10 dB depending on the packaging. Similarly, a patch antenna according to some embodiments of the present invention may provide a gain improvement of a factor of about 2, i.e. about 3 dB, over the gain without packaging considerations. Thus, some embodiments of the present invention are capable of saving transmission power on satellites. Although the discussion herein is directed to antennas for use with satellites, such as a CubeSat, it is understood that the antennas may be used with other non-satellite, high-gain applications (e.g., modems) according to additional embodiments.

According to one embodiment, an antenna is a high gain S-band reflector antenna exploiting a solar deployable panel as a reflector. In one embodiment, the antenna operates above the VHF band of frequencies. According to another embodiment, a high gain patch antenna may be used, while in an additional embodiment, a compact parabolic antenna positioned for high gain is employed. The concept may be extended to one or more monopoles, a patch antenna, or a parabolic antenna for beam forming to assist in improving the coverage of satellite telemetry. The particular antenna design may include considerations of bandwidth, power, satellite coverage, packaging, as well as attitude stability, and orbital decay. Depending on the packaging, the antennas may have a gain of more than about 7 dBi and a bandwidth of more than about 40 MHz. The antennas may also be employed in gravity gradient configuration of CubeSat or in a 1U CubeSat form factor (10×10×10 cm) with a few structural modifications.

In one embodiment, a satellite comprising a payload configured for transmitting data is provided. The payload may include various components of the satellite, such as the attitude control system, electrical power system, and/or communication system. The satellite may be configured to communicate with one or more ground stations. The satellite includes a support structure comprising at least one deployable reflector panel, wherein the support structure houses the payload. The satellite also includes at least one antenna coupled to the support structure, wherein the deployable reflector panel is configured to cover the antenna in a non-deployed state and to expose the antenna in a deployed state.

BRIEF DESCRIPTION OF THE DRAWINGS

Reference will now be made to the accompanying drawings, which are not necessarily drawn to scale, and wherein.

DETAILED DESCRIPTION OF VARIOUS EMBODIMENTS OF THE INVENTION

Figure 1:
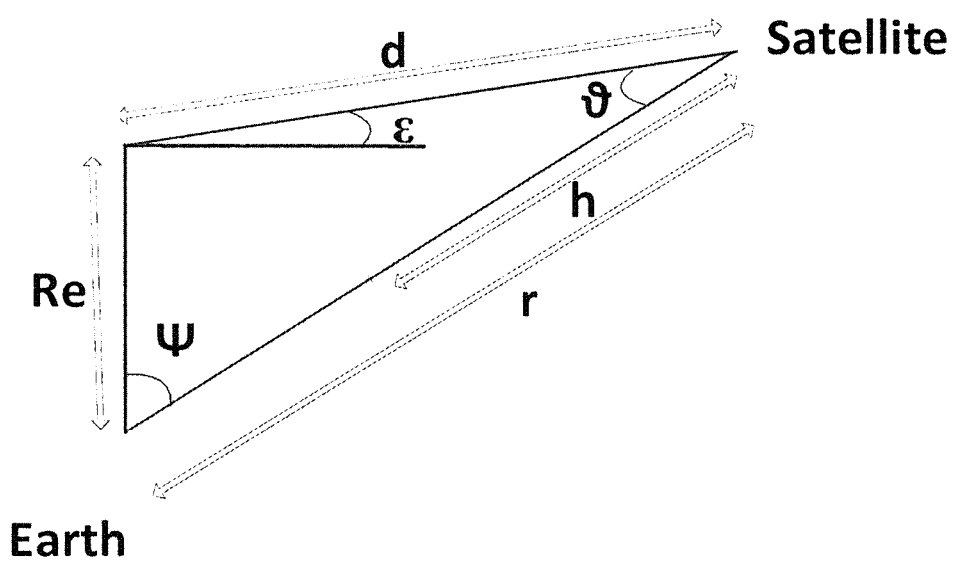
FIG. 1 illustrates a geometric representation of slant distance.

Various embodiments of the present invention will now be described more fully hereinafter with reference to the accompanying figures, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

Details regarding various embodiments of the antennas and methods of assembly within small satellites are described herein. Specifically, some embodiments of the present invention are described with respect to three design reports that are included herein. The first report, entitled "Configuration of 3U CubeSat Structures for Gain Improvement of S-band Antennas," is a detailed design report of certain embodiments of antennas and setups thereof for use with small satellites. The second report, entitled "Antenna Setups For Pico- And Nano-Satellite Communication Link Coverage Improvement," includes various antennas and antenna setups according to embodiments of the invention. The third report, entitled "A Nano-Satellite Constellation for Advanced Fire Detection," includes a description of a nano-satellite constellation according to various embodiments of the present invention. Embodiments of the present invention are not meant to be limited to the example descriptions in these reports.

The following patent applications are also incorporated by reference in their entirety and provide various exemplary details regarding small satellites that may be incorporated with embodiments of the present invention: International Application No. PCT/US2010/035397, Attitude Control System for Small Satellites, filed May 19, 2010; International Application No. PCT/US2010/050854, Split Flywheel Assembly with Attitude Jitter Minimization, filed Sep. 30, 2010; and International Application No. PCT/US2011/043128, System and Method for Assessing the Performance of an Attitude Control System for Small Satellites, filed Jul. 7, 2011.

Configuration of 3U CubeSat Structures for Gain Improvement of S-Band Antennas

Nano- and pico-satellites in low earth orbit (LEO), unlike their larger counterparts, have more stringent limitations on antenna design due to power constraints that govern the operational frequency and size that defines the mass and volume constraints. High bandwidth applications use higher frequencies and require higher transmission power. High gain antennas can reduce the transmission power requirements. CubeSat's with body-mounted solar cells are limited in power generation due to limited surface area. In some embodiments, deployable solar panels offer a solution to the limited power by maximizing the surface area of solar cells exposed to solar radiation. The metallic deployable solar panel support structure can be exploited to behave as an electrical ground and microwave signal reflector for a high gain antenna in several configurations. This report presents multiple novel high-gain S-band antennas that exploit the structure of a 3U CubeSat equipped with deployable solar panels for gain improvement. The configuration of the satellite is designed to operate in a low drag configuration by operating outside of the passive gravity gradient stabilized attitude by using passive or active attitude control. Gain improvements of more than 3 dB are obtained through careful packaging. The antenna setups have a gain of more than 7 dBi and bandwidth of more than 10 MHz. Analysis is provided with considerations of power, satellite coverage, as well as attitude stability. This technique of improving antenna gain can be extended to higher as well as lower frequency of operation.

Reduced cost, rapid development time and the availability of small form factor attitude control systems has paved the way for high-utility applications of CubeSats such as fire detection, animal tracking and weather monitoring. However, some new mission applications impose a heavier demand on the communication subsystem. For example, fire detection requires high resolution imaging of specific geographic areas and hence increases the bandwidth requirement for the communication downlink.

Bandwidth-intensive applications motivate the need for higher frequency communications downlink. The S-band frequency spectrum, ranging from 2.2 GHz to 2.3 GHz as defined by the Federal Communications Commission (FCC), is one such frequency band that can be used for such applications. Studies have been performed on the use of S-band communication capabilities of 3U CubeSats. However, higher frequencies are subject to higher path loss. Thus, to maintain a good communication link, higher transmission power is required.

High resolution imaging through CubeSats requires a relatively power-intensive and high-precision attitude determination and control system (ADCS) with up to a few arc-sec precision. Additionally, these systems contain other power-hungry hardware such as dedicated image-processing units and high resolution imaging equipment. This high power demand coupled with the surface area constraint imposed by the CubeSat form factor inhibits the possibility of sufficiently increasing the transmission power to meet the demands on the communication downlink. Friss' free-space path loss equation shows that the transmission power for S-band communication can be reduced by employing high gain antennas. Designing high gain antennas for a size constrained 3U CubeSat is challenging. Fortunately, recent advances in small form factor active attitude control systems makes it possible to use high-gain directional antennas on CubeSats to minimize communication link quality degradation due to pointing accuracy loss associated with such antennas.

Basic analysis shows that 3U CubeSats employing deployable solar panels are capable of generating up to 30 W of power. The deployable solar panels metallic mounting structure can be exploited to achieve higher antenna gains through smarter packaging without necessitating the need for complex antenna designs.

Satellite ground coverage reduces with increased antenna gain. Thus, the antenna design should be such that the gain is sufficient to meet the required link quality and coverage. In this report, a novel concept for high gain antenna design that exploits the structure of a 3U CubeSat equipped with deployable solar panels and designed to be in a low drag configuration by operating outside of the passive gravity gradient attitude using active attitude control is presented.

Approach

Utilizing some of the possible deployable solar panel configurations, several S-band antenna designs are developed for gain values derived from detailed link budget analysis through consideration of power and footprint. Analysis is performed to evaluate satellite coverage and attitude stability.

To evaluate the characteristics of each antenna design, the ANSYS HFSS 3D electromagnetic simulation tool computes the gain, beam width and impedance. Mock setups of the antennas are developed to evaluate the antenna impedance and improvement of received signal strength due to increased gain. Tests are then performed on antenna prototypes using an S-band transceiver and HP Agilent Vector Network Analyzer (VNA) HP8720ES. It is shown that the mission utility of each design is dictated by the mission requirement and the design concepts described can be extended to higher frequencies and other CubeSat form factors.

Communication Link Budget

Image transmission over a wireless channel is a bandwidth-intensive process requiring higher transmission power than typical CubeSat missions. High-resolution images captured for applications like fire detection are shown to require about 33 Mbits of information per image. If the QPSK modulation scheme is assumed, then the required transmission bandwidth is 33 MHz. Such high bandwidth is difficult to achieve due to system complexities at higher frequencies. Hence, the data should be transmitted with lower data rates. For the antenna design developed in this paper a bandwidth of 10 MHz is considered.

Image transmission requires a lower bit error rate (BER) and hence the sensitivity (S) requirement for the receiver increases [4], such that $$S = 10 \log kT_{sys} + 10 \log B + SNR + NF, \quad (1)$$

where k=Boltzmann constant; Tsys=system noise temperature; SNR=signal-to-noise ratio (9.2 dB for QPSK modulation scheme with bit error rate of $10^{-6}$); B=bandwidth (10 MHz); and NF=noise factor (1.5).

The system noise temperature is given by $$T_{antenna} = 10^{\frac{-\alpha}{10}} T_{ant} + (1 - 10^{\frac{-\alpha}{10}}) T_l \quad (2)$$

$$T_{sys} = T_{antenna} + (F - 1) T_0, \quad (3)$$

where $T_{ant}$=Antenna noise temperature (150K); $T_0$=room temperature (300K); $T_l$=transmission line and connector loss temperature (290K); a=connector loss (1 dB); F=noise factor (2 dB); and $T_{sys}$=System noise temperature.

The antenna noise temperature is assumed to be 150K. Taking all these parameters into consideration, the required receiver sensitivity to achieve a data rate of 10 Mbps is approximately −121.5 dB. Thus the received signal strength should be a minimum of −121.5 dB to obtain 10 MHz bandwidth.

Friss' free-space path loss in Eq. (4) shows that the received signal power is governed by transmission power ($P_t$) of 1 W, distance (R) of 500 km, transmitter antenna gain ($G_t$), receiver antenna gain ($G_r$), atmospheric loss (A) of 3 dB, polarization mismatch loss (P) of 2 dB, reflection coefficient (γ) of −20 dB and 13 cm wavelength of signal at 2.3 GHz (λ).[3] A sensitivity of −121.5 dB can be attained through careful selection of antenna gain.

$$P_r = P_t + G_t + G_r + 20 \log_{10} \lambda - 20 \log_{10} 4\pi R - A - P - 10 \log(1-|\gamma|^2) dB \quad (4)$$

The ground station is assumed to use an S-band parabolic dish antenna with a 2 m diameter (D), working at 2.3 GHz frequency (f), and with an aperture efficiency (ii) of 55%. The gain $G_t$ of the antenna is 30.8 dB where c is speed of light.

$$G = 10 \log_{10}\left(\eta \left(\frac{\pi D f}{c}\right)^2\right) \quad (5)$$

As shown in FIG. 1, for a low earth orbit satellite's communication link, the distance R between the satellite and ground station varies due to orbital motion. This motion leads to non-uniform strength of received signals due to path length variations. Given the parameters of elevation angle (ε), nadir angle (ϑ), radius of Earth (Re), Earth central angle (Ψ), the variation in path with elevation (d) can be evaluated.

$$\varphi = \frac{\pi}{2} - \vartheta - \varepsilon \quad (6)$$

$$\vartheta = \arcsin\left(\frac{Re}{r} \cos \varepsilon\right) \quad (7)$$

$$\varepsilon = \arccos\left(\frac{r}{Re} \sin \vartheta\right) \quad (8)$$

$$d = \sqrt{Re^2 + r^e - 2Re \, r \cos \varphi} \quad (9)$$

Figure 2:
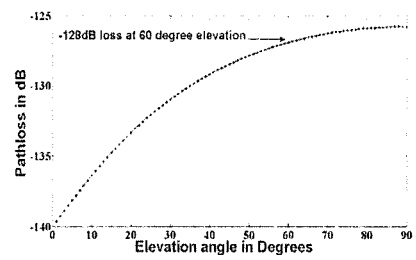
FIG. 2 illustrates a graph showing path loss variation with elevation angle, in accordance with various embodiments of the present invention.

Excluding the transmit antenna gain, the path loss variation with elevation angle is shown in FIG. 2. It shows about 2 dB difference between path loss at zenith and at elevation of 60 degrees leading to power fluctuation at receiver. If the elevation angle for a good communication link is set to 60 degrees, then the path loss obtained is about −128 dB, which is 6.5 dB lower than the sensitivity requirement of 121.5 dB obtained earlier. At zenith the loss is 4.5 dB lower than the sensitivity requirement. To compensate for this variation, the antenna gain should be increased, as an increase in transmission power is not an option for CubeSats. Thus, the antenna radiation pattern should have a minimum beamwidth of 60 degrees, such that the corresponding gain at 60 degrees elevation angle is more than 6.5 dB.

The antenna radiation pattern shows a variation of antenna gain across the space. The received signal strength, being related to the transmitter antenna gain, depends on the region of radiation pattern pointed to by the ground station antenna.[9] Hence, to attain desired link quality, the antenna should be designed with a radiation pattern profile such that the gain as seen by ground station at 60 degrees elevation corresponds to the system requirement of 6.5 dB and hence the beam width requirement of antenna should be about 60 degrees with minimum gain of 6.5 dB. This is a fundamental design criteria for the antenna discussed in this report.

Antenna Design

Monopole and patch antennas have found wide application in wireless communication. While patch antennas can have high gain depending on the configuration, monopole antennas have lower gain, but omni-directionality. Patch antennas, being planar, can be integrated easily onto the body of a CubeSat, whereas a CubeSat monopole antenna requires a deployment mechanism. The gains of both patch and monopole antennas can be increased through careful design consideration of antenna packaging. Specifically, the gain of patch and monopole antennas increases with ground plane size. Gain also depends on the ground plane shape, as seen in the parabolic corner reflector antenna.

Given that the CubeSat body and deployable solar panel support structure are metallic, the structure can behave as an extended ground plane or reflector, as in the case of a parabolic corner reflector antenna, to improve the antenna gain. Employing this concept, three antenna configurations are designed, developed, and tested:

1U and 3U Reflector Antenna with Radiating Monopole.
Extended Parabolic Reflector Antenna with deployable panels.
Extended Inclined Ground Patch Antenna.

1U Reflector Antenna with Radiating Monopole

Figure 3:
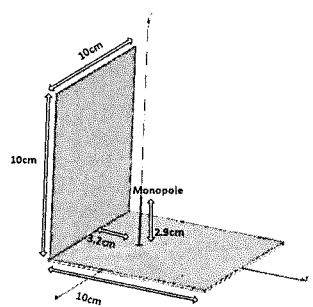
FIG. 3 illustrates an example simulation setup of a 1U reflector antenna with radiating monopole, according to one embodiment of the present invention.
Figure 4:
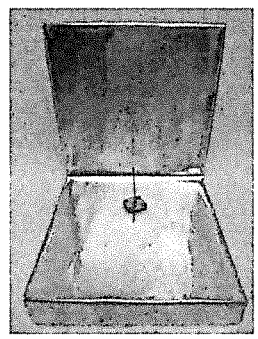
FIG. 4 shows a perspective view of an example physical model of a 1U reflector antenna with radiating monopole, according to one embodiment of the present invention.

A monopole antenna is the simplest antenna design, consisting of a quarter wavelength radiating element with a low gain of 1.65 dB. This gain can be increased proportionally to a ground plane size increase Improvement in gain and directionality can also be achieved by placing a reflector behind the monopole as in case of reflector antenna with dipole. The distance between the reflector and the antenna defines the impedance and gain. The distance is maintained at about 0.2λ. For a 1U CubeSat, the dimension of each side is limited to 10 cm×10 cm. Hence the ground and reflector sizes are constrained to the same. Designing the metallic solar panel support structure to act as a reflector and using the body of the CubeSat as ground, a monopole reflector antenna with a monopole as radiation element can be constructed. This design differs from a dipole with reflector as in Yagi-Uda antenna. Length of the monopole-radiating element is a quarter wavelength at S-band 2.3 GHz frequency, which equates to about 3 cm. The antenna is placed at the ground plane center as shown in FIG. 3. The distance between the reflector and antenna is a quarter wavelength, or 3 cm. This distance is adjusted such that the antenna input impedance is close to the monopole input impedance, of about 40 ohms, to obtain reflection coefficient of less than −10 dB such that the loss due to impedance mismatch is minimized ANSYS HFSS simulation setups of the antenna, along with the appropriate dimensions, are shown in FIG. 3. An example physical model is shown in FIG. 4.

Figure 5:
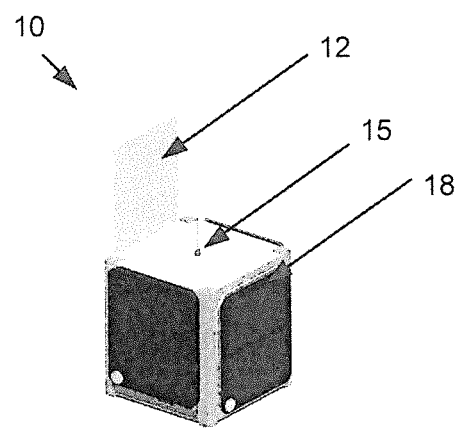
FIG. 5 illustrates an example CAD model of a 1U reflector antenna with radiating monopole, according to one embodiment of the present invention.

FIG. 5 shows an example computer aided design (CAD) model of the antenna setup used for evaluating the 1U CubeSat monopole performance. As shown in FIG. 5, the satellite 10 may include a support structure 18 with a deployable reflector panel 12. The antenna 15 may comprise a 1U reflector antenna with radiating monopole. With reference to FIG. 5, the deployable reflector panel 12 may cover the antenna 15 in the non-deployed state and expose the antenna in the deployed state (shown in FIG. 5).

Figure 6:
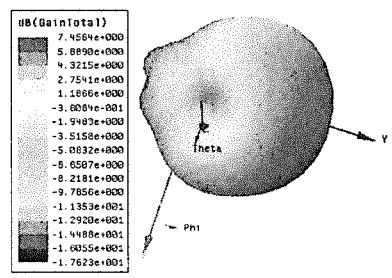
FIG. 6 illustrates a 3D radiation pattern simulation result for a 1U reflector antenna with radiating monopole, according to one embodiment of the present invention.
Figure 7:
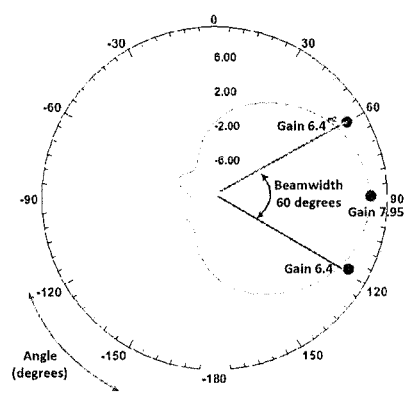
FIG. 7 illustrates a 2D radiation pattern simulation result for a 1U reflector antenna with radiating monopole, according to one embodiment of the present invention.
Figure 8:
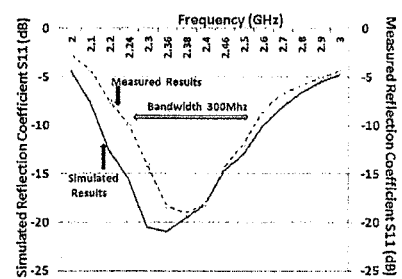
FIG. 8 illustrates simulation and measurement results of reflection coefficient for a 1U reflector antenna with radiating monopole, according to one embodiment of the present invention.

The 2D and 3D radiation pattern, as obtained from ANSYS HFSS, are shown in FIG. 6 and FIG. 7, respectively. As shown in FIG. 8, it is observed that the gain of this antenna setup with the reflector is about 7.5 dB with 6.5 dB gain at 30 degrees, thus providing the corresponding gain at elevation of 60 degrees. The corresponding reflection coefficient plots as simulated with ANSYS HFSS and measured using VNA are shown in FIG. 8. It is noticed that the simulation and measurement results are in good agreement with the minimum reflection coefficient at 2.3 GHz, which is −20 dB. The impedance of the antenna is measured to be about 42 ohms.

The 1U CubeSat model discussed up to this point has served as a proof of concept for the concept of using deployable structures for improved gain. The following designs show the extension of the lessons learned from the 1U model to the more capable 3U form factor utilizing deployable panels.

3U Monopole with Deployable Reflector Structure

Figure 9:
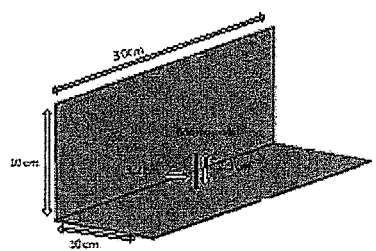
FIG. 9 illustrates an example simulation setup of a reflector antenna with radiating monopole, according to one embodiment of the present invention.
Figure 10:
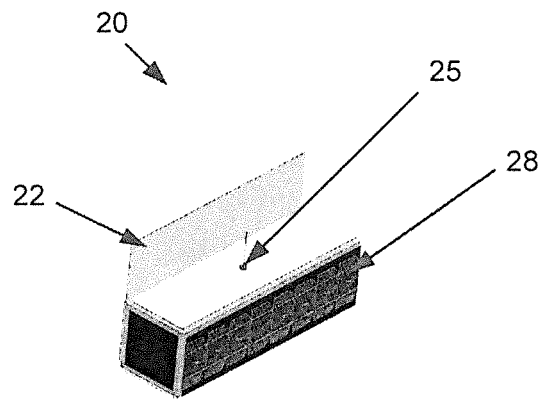
FIG. 10 illustrates an example CAD model of a 3U reflector antenna with radiating monopole, according to one embodiment of the present invention.

The 3U monopole with reflector is shown with dimensions in FIG. 9 and with the full structure in FIG. 10. Similar to the 1U design shown, for example, in FIG. 5, the monopole is placed at the center of one of the long faces at about 3.2 cm from the panel reflector to obtain a good impedance matching at 2.3 GHz. In particular, FIG. 10 shows an example computer aided design (CAD) model of this example antenna setup used for evaluating the 3U CubeSat monopole performance. The satellite 20 may include a support structure 28 with a deployable reflector panel 22. The antenna 25 may comprise a 3U reflector antenna with radiating monopole. With reference to FIG. 10, the deployable reflector panel 22 may cover the antenna 25 in the non-deployed state and expose the antenna in the deployed state (shown in FIG. 10).

Figure 11:
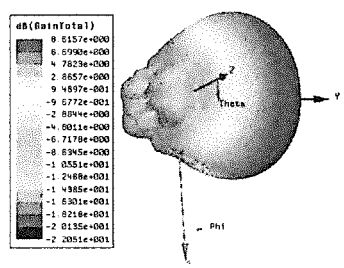
FIG. 11 illustrates 3D radiation pattern simulation results for a 3U reflector antenna with radiating monopole, according to one embodiment of the present invention.
Figure 12:
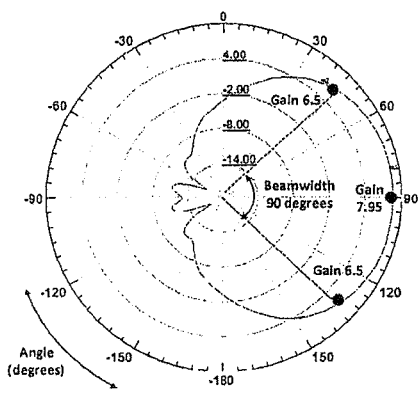
FIG. 12 illustrates 2D radiation pattern simulation results for a 3U CubeSat setup with a reflector antenna with radiating monopole, according to one embodiment of the present invention.

The simulation 3D and results of FIG. 11 and 2D results of FIG. 12 show a peak gain of 8.6 dB with 6.5 dB beam width at 90 degrees. This observed gain is much more than the required 60-degree beam width. Hence, the 3U configuration of reflector antenna with monopole has marked improvement in ground coverage and gain.

Monopole with Parabolic Reflector

A parabolic reflector antenna can also be designed for the case where it is not possible to have deployable panels. In this case, the reflector is packaged into the body of the 3U CubeSat. The monopole with rectangular reflector, discussed in previous section, can be modified to have a parabolic reflector similar to a parabolic corner reflector used with dipole antennas.

Figure 13:
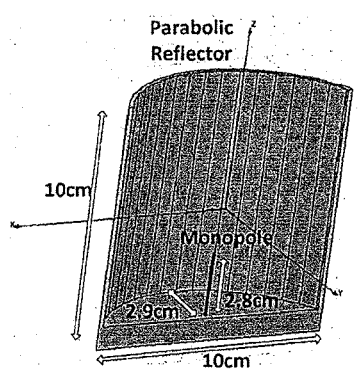
FIG. 13 illustrates an example simulation setup of a monopole with a parabolic reflector, according to one embodiment of the present invention.
Figure 14:
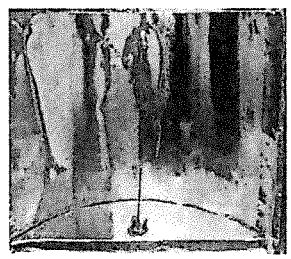
FIG. 14 illustrates an example physical model for a monopole with a parabolic reflector, according to one embodiment of the present invention.
Figure 15:
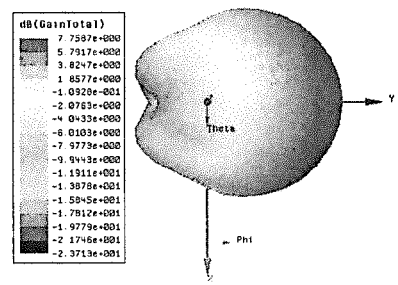
FIG. 15 illustrates 3D radiation pattern simulation results for a 3U CubeSat setup with a parabolic reflector at 2.3 GHz, according to one embodiment of the present invention.

The monopole antenna, having a quarter wavelength of about 2.8 cm and operating at 2.3 GHz, is placed at a distance of more than its length to maximize the gain and to improve the impedance matching. The monopole antenna is positioned such that the impedance of the antenna provides a reflection coefficient of less than −10 dB and bandwidth greater than 10 MHz. FIGS. 13 and 14 show the setup of parabolic reflector antenna with monopole. From FIG. 15, the radiation pattern as obtained from ANSYS HFSS simulation at 2.3 GHz shows a gain of 7.7 dB. Since the gain is proportional to the reflector area, it can be further improved by increasing size of the reflector. This antenna design can be accommodated by both the 3U and 1U CubeSat bodies.

3U Parabolic Antenna with Deployable Extended Reflector

Figure 16:
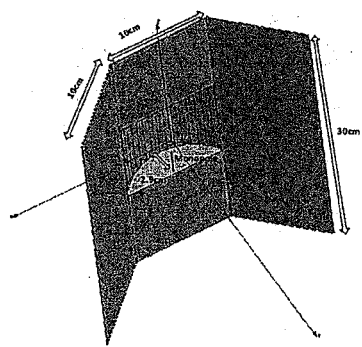
FIG. 16 illustrates an example simulation setup of a 3U parabolic antenna with deployable extended reflector, according to one embodiment of the present invention.

The previous parabolic reflector antenna gain can be further improved with deployable solar panels such that the metallic solar panel support structures act as extensions of the parabolic reflector. The parabolic reflector antenna is placed in the middle of the longest side of 3U CubeSat containing a deployable solar panel. The parabolic structure is embedded onto the body of CubeSat, such that the body, as well as the deployable solar panel support structure, acts as an extension of the reflector, thus improving the antenna gain. Additionally, inclining the solar panel leads to further gain improvement. A simulation setup of the antenna on a 3U CubeSat with deployable panels and its associated CAD and physical setup are shown in FIGS. 16 and 17, respectively.

Figure 17:
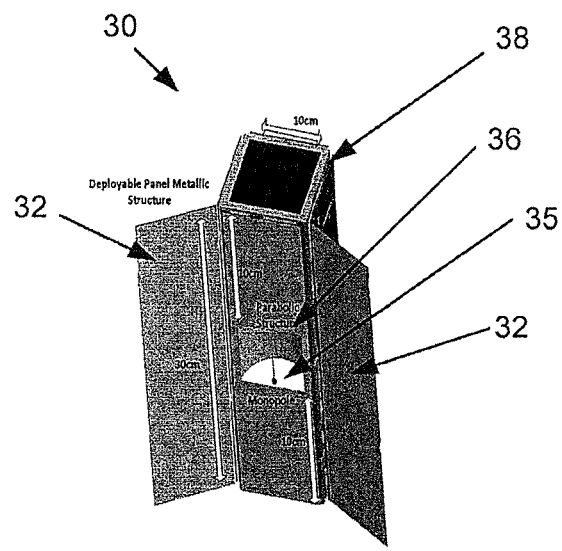
FIG. 17 illustrates an example CAD model of a 3U parabolic antenna with deployable extended reflector, according to one embodiment of the present invention.

In particular, FIG. 17 shows an example computer aided design (CAD) model of this example antenna setup used for evaluating the 3U CubeSat parabolic antenna performance. The satellite 30 may include a support structure 38 with two deployable reflector panels 32. The antenna 35 may be housed with a corresponding parabolic reflector 36. With reference to FIG. 17, the deployable reflector panels 32 may cover the antenna 35 in the non-deployed state and expose the antenna in the deployed state (shown in FIG. 17).

Figure 18:
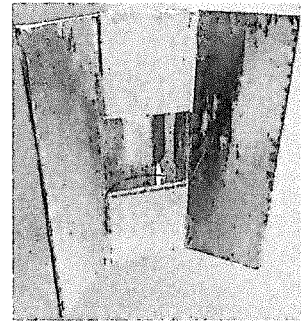
FIG. 18 illustrates an example physical model of a 3U parabolic antenna with deployable extended reflector, according to one embodiment of the present invention.
Figure 19:
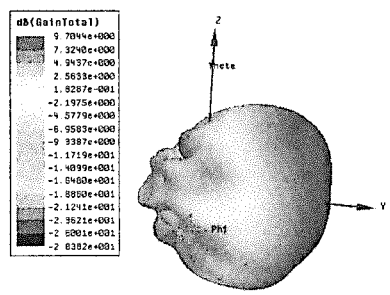
FIG. 19 illustrates 3D radiation pattern simulation results for a 3U parabolic antenna with deployable extended reflector, according to one embodiment of the present invention.
Figure 20:
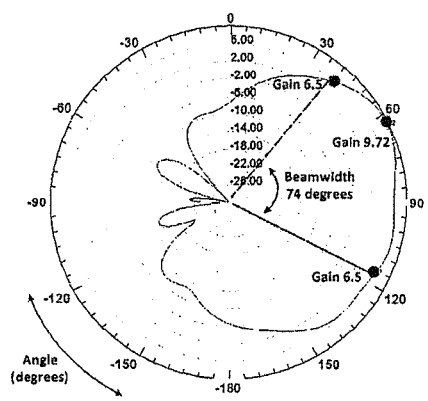
FIG. 20 illustrates 2D radiation pattern simulation results for a 3U parabolic antenna with deployable extended reflector, according to one embodiment of the present invention.
Figure 21:
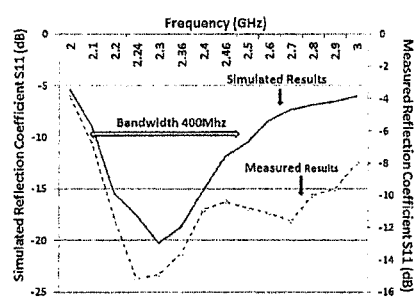
FIG. 21 illustrates simulation and measurement results of a reflection coefficient, according to one embodiment of the present invention.

A physical model of this antenna setup, shown in FIG. 18, has been developed to evaluate the performance. The HFSS simulation results of FIG. 19 and FIG. 20, shows a gain of 9.7 dB with 6.5 dB gain beam width of about 74 degrees, which is more than design requirement. The reflection coefficient computed from ANSYS HFSS simulation and measured using VNA show good agreement as depicted in FIG. 21. The reflection coefficient plot shows a −10 dB bandwidth of more than 10 MHz with a minimum of −24 dB reflection coefficient at 2.3 GHz. Note, the impedance of the antenna is about 42 ohms.

Thus, placing the parabolic antenna in the center of one of the sides with deployable panels provides an additional gain of more than 2 dB above the gain of parabolic reflector with monopole without deployable panels and an improvement in coverage through a wider beam width. The insights gained from this design can be further extended by noting that the method of placing the antenna in the center of a 3U CubeSat to improve gain can be extended to other antenna types such as patch or patch array antennas.

3U Extended Inclined Ground Patch Antenna

In the previous section it was concluded that placing the antenna in center of one of the 3U CubeSat sides with deployable panels could improve the gain. This concept can be extended to gain improvement of patch antennas. The metallic body of the satellite can be used as an extension of the patch antenna ground, which leads to an increase in gain due to increased ground plane size. Patch antennas with lower gains, like annular ring patch antennas with gain of 4.7 dB, can be made to have more than 3 dB gain improvement through such configuration.

Figure 22:
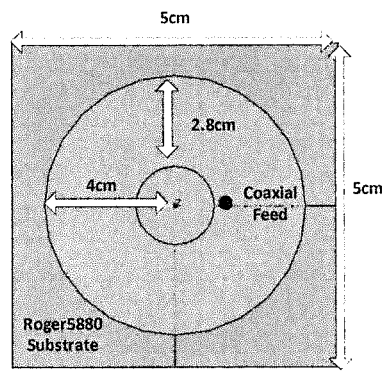
FIG. 22 illustrates an example S-Band annular Ging patch antenna design, according to one embodiment of the present invention.
Figure 23:
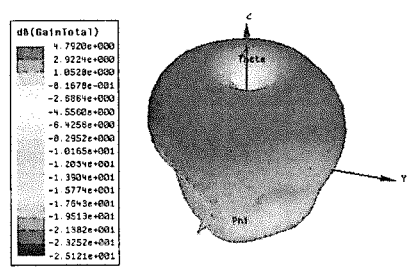
FIG. 23 illustrates an example simulated annular ring patch antenna 3D radiation pattern, according to one embodiment of the present invention.

The annular-ring patch antenna, shown in FIG. 22, consists of a ring-like configuration of copper trace on a substrate, which is assumed to be Rogers5880 with 1.59 cm thickness. The ring is designed such that the circumference of the center circle of the ring is approximately a wavelength corresponding to a frequency of 2.4 GHz. The position of the antenna feed is adjusted to obtain 50 ohm input impedance. FIG. 23 shows that annular-ring patch antenna, without deployable structures, has a gain of 4.79 dB.

3U Extended Inclined Ground Patch Antenna with Deployable Panels

Figure 24:
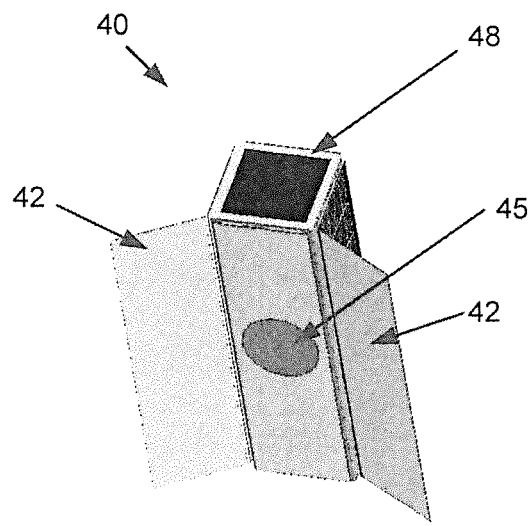
FIG. 24 illustrates an example CAD model of 3U annular ring patch antenna, according to one embodiment of the present invention.
Figure 25:
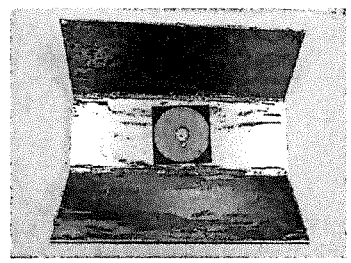
FIG. 25 illustrates an example physical model of annular ring patch antenna, according to one embodiment of the present invention.

The gain of the annular-ring patch antenna can be increased by placing the antenna in the center of one of the sides of the 3U CubeSat with metallic deployable solar panels. FIG. 24 shows the antenna setup on the 3U CubeSat. The fabricated antenna with the test model of 3U CubeSat configuration is as shown in FIG. 25.

In particular, FIG. 24 shows an example computer aided design (CAD) model of this example antenna setup. The satellite 40 may include a support structure 48 with two deployable reflector panels 42. The deployable reflector panels 42 may cover the annular-ring patch antenna 45 in the non-deployed state and expose the antenna in the deployed state (shown in FIG. 24).

Figure 26:
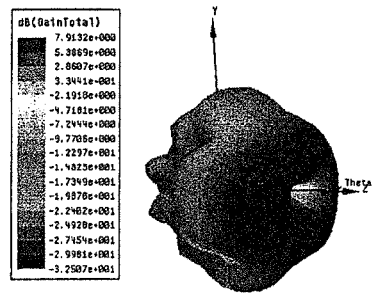
FIG. 26 illustrates an example simulated 3D radiation pattern of an annular ring patch antenna on a 3U CubeSat, according to one embodiment of the present invention.
Figure 27:
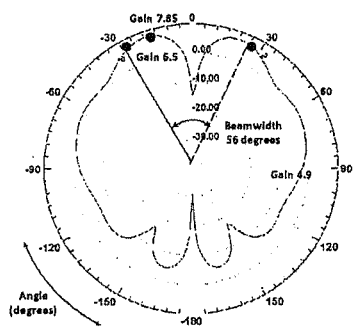
FIG. 27 illustrates an example simulated 2D radiation pattern of an annular ring patch antenna on a 3U CubeSat, according to one embodiment of the present invention.

FIGS. 26 and 27 show the 3D and 2D radiation pattern as obtained from simulation. It is observed that by using deployable panels, the gain is 7.9 dB, which is a 3 dB gain improvement on the annular-ring patch antenna gain of 4.5 dB without deployable panels. Additionally, the antenna has a 6.5 dB beam width of 56 degrees that is closer to the required 60 degree beam width. The concept can be extended to other patch antennas like rectangular patch antenna.

Antenna Measurement Setup

Figure 28:
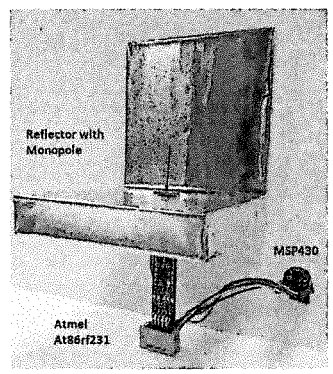
FIG. 28 illustrates an example RSSI evaluation setup for a S-band antenna, according to one embodiment of the present invention.

Up to this point, all of the designs have been verified through simulation. All of the presented antenna designs developed were also evaluated with a setup consisting of a transceiver, microcontroller and commercial 7 dBi gain patch antenna. The setup consists of transmitter setup with software embedded on an MSP430f2012 microcontroller that communicates with an Atmel At86rf212 S-band transceiver to transmit packets with output power of 0 dBm through a commercially available patch antenna with 7 dBi gain. Packets are received and evaluated for the Received Signal Strength Indicator (RSSI) to verify the gain improvement over the 7 dBi gain antenna. The setup is as shown in FIG. 28. Table 1 lists the RSSI values obtained with a reference antenna each tested antenna. It can be observed that the received signal strength for the antennas shows improvement in gain comparable to the antenna gain improvement over 7 dBi.

TABLE 1

Style Specifications

| Antenna | RSSI Improvement over 7 dBi gain antenna |
| --- | --- |
| 1U reflector with monopole | 1 dB |
| 3U reflector with monopole | 2 dB |
| 3U Parabolic reflector with monopole | 3 dB |
| 3U Annular patch antenna | 1 dB |

Stability Consideration

Multiple antennas were designed, developed, and tested for the purpose of gain improvement with the intention of implementation on orbit. One important consideration for the implementation of these antennas is how they impact attitude. There are two aspects that must be considered:
  Operating attitude of the antenna design
  Gravity-gradient stabilized attitude The operating attitude is determined by the directionality of the antenna and the orientation of the antenna relative to the spacecraft body. Gravity-gradient torque is applied to non-uniform inertia satellites, which act to align the minimum principal axis with the gravity vector and passively spin-stabilize the satellite. If the operating attitude of the antenna design and the gravity-gradient stabilized attitude conflict, then active attitude control is necessary to communicate with each directional antenna design.

Without loss of generality, the principal axes of the 3U CubeSat will be assumed to align with the standard body-fixed axes such that the z-axis is parallel to the longitudinal axis, and the x- and y-axis point out of the other satellite faces. Therefore, a 3U CubeSat, minus deployed panels, will reach a gravity-gradient stabilized attitude pointing along the z-axis.

Drag and Orbital Lifetime Considerations

Since each of the designs operates with the longitudinal axis parallel to the relative atmospheric velocity. The drag area is minimized, which maximizes the orbital life-time without station keeping maneuvers. This does come at the cost of power utilization for maintaining the attitude using active attitude control.

Conclusion

Several improved antenna designs have been designed, developed, simulated, and tested with respect to gain performance. These antennas were designed to be packaged for 1U and 3U CubeSat platforms. Each antenna was required to have a beam width of greater than 60 degrees, bandwidth greater than 10 MHz, and gain greater than 7 dB. Simulation and test measurements verified the performance of the antenna setups.

A link budget analysis was performed to estimate the gain requirements for based on sensitivity requirements such that the maximum transmit power is limited to 1 W that is representative of the standard power consumption of available CubeSat communication subsystems. The antennas were also tested to evaluate the improvement in received signal strength using an Atmel transceiver and software running on an MSP430f2012 microcontroller. Although these designs apply to linear polarized antennas, the concepts presented can be extended to circular polarized antennas, like crossed dipoles, instead of monopole configurations to further improve link quality.

Antenna Setups for Pico- and Nano-Satellite Communication Link Coverage Improvement Distance and power requirement for transmission of data from the satellite to the ground station limits the frequency of operation and bandwidth of communication channel for Nano and Pico satellites. This limitation plays a crucial role in applications like imaging that require high bandwidth for communication link. An RF system used for communication consists of various blocks of electronics like Power amplifiers, low noise amplifiers, filters, mixers, Phase lock loops, Digital signal processing units and the antenna. The performance of wireless transceiver and hence a communication link is effected by the performance of these block defined by gain, intermodulation figure, impedance, noise figure etc.

Antenna characteristics of 3 dB beam width, bandwidth, polarization, gain and impedance contributes to the performance of communication link as shall be discussed in later sections. The beam width of antenna translates to antenna footprint and hence the coverage of the satellite communication link for the ground stations. Antenna performance is also affected by the placement of antenna on the satellite body that leads to impedance mismatch and gain reduction leading to careful packaging of antenna. Antenna beam width is a critical factor in defining the communication link performance apart from gain and polarization. As the gain of antenna increases the footprint decreases due to reduction in beam width and this would reduce the visibility duration of satellite for the microwave frequency though the optical visibility exists. This leads to pointing loss for ground station due to atmospheric scattering that may increase or decrease the footprint of antenna. Furthermore, it leads to reduction in time for transmitting data to the ground station, thus paving way for high bandwidth of transmission such that all the desired data could be transferred in a short duration. This calls for increased power of transmission that needs to be compensated with high gain antennas that may have pointing loss. Hence a compromise should be achieved on the link budget such that a good communication link is maintained. These details of visibility, gain, beam width and bandwidth are covered as part of this work.

The channel characteristics like atmospheric loss, loss due to rain, humidity and ionospheric polarization rotation contributes to additional attenuation of received signal. Most significant of the losses come from path loss that depends on the distance between the satellite and ground station. The proposal targeted at high bandwidth application covers the communication system design with a focus on antenna systems for Pico and Nano Satellites that could provide improved coverage and minimize the power consumption. A detailed communication link budget analysis is performed through consideration of all these aspects to propose a system with lower transmission power for Pico and Nano satellites.

Communications Link Budget

The following section describes in detail the analysis and trade space required to form the link budget of the proposed mission. High bandwidth transmission over a wireless channel requires higher transmission power since higher frequencies are targeted for communication links. In regards to CubeSats, this creates new challenges for wireless communication system hardware and software designs for a size constrained system. Antenna is one of the key elements of communication system hardware. The task of antenna design and the associated system for high bandwidth link involves:

Sensitivity requirement analysis.
Path loss analysis.
Satellite foot print and coverage consideration.
Antenna selection, design and packaging.
RF system design.

Sensitivity Requirement

Good transmission generally requires a low Bit Error Rate (BER) and hence the sensitivity (S) requirement for the receiver increases [4], such that $$S = 10 \log kT_{sys} + 10 \log B + SNR + NF \quad (1)$$

where, K is the Boltzmann constant, Tsys is the system noise temperature, SNR is the signal to noise ratio; required to be approximately 9.2 dB for QPSK modulation scheme, B is the bandwidth, which is the same as the transmission data rate for QPSK, and NF is the noise figure assumed to be 3 dB.

Figure 29:
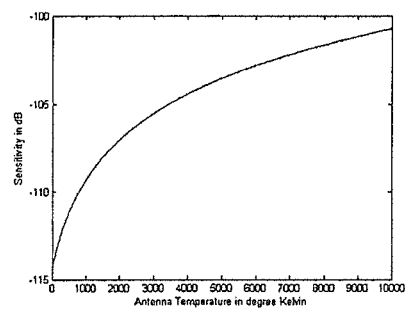
FIG. 29 shows a plot of sensitivity variation with system temperature, according to one embodiment of the present invention.

Referring, to FIG. 29, taking all these parameters into consideration, the required sensitivity to achieve a data rate of 50 Mbps is approximately −112 dB. Thus the received signal strength should be a minimum of −112 dB to get a 50 MHz bandwidth.

Path Loss Analysis

Path loss as given by Friss' free space path loss equation [2] is one of the significant contributors to reduction in received signal strength at the ground station. The atmospheric conditions, such as humidity and ionization, also contribute to the losses. Apart from this, there are losses associated with antenna polarization mismatch between the transmitter antenna and receiver antenna, the loss due to impedance mismatch and connector losses. Thus the path equation is modified to $$P_r = P_t + G_t + G_r + 20 \log_{10} \lambda - 20 \log_{10} 4\pi R - A - P - 10 \log(1 - |\gamma|^2) \text{ dB} \quad (2)$$

where, Pr is the received signal strength, $P_t$ is the transmitted signal power, λ is the wavelength of 12.5 cm at 2.4 GHz, R is the distance, Gt and Gr are the transmitter and receiver antenna gains, A is the atmospheric loss that is approximately 3 dB at 2.4 GHz, P is the polarization loss of approximately −2 dB, and γ is the reflection coefficient assumed to be −20 dB. Using a circular polarized antenna on the receiver and transmitter could minimize polarization losses and use of proper impedance matching networks and impedance mismatch. But, due to inherent resistive losses, the efficiency of receiver is not perfect.

Figure 30:
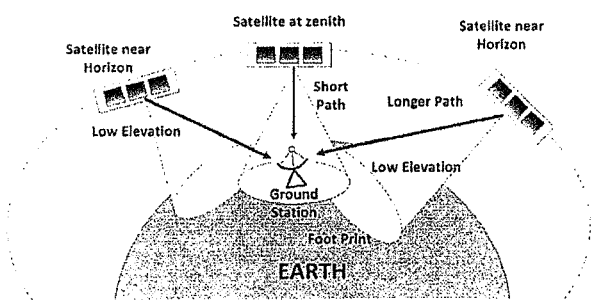
FIG. 30 illustrates possible antenna elevations, according to one embodiment of the present invention.

The distance R between the ground station and satellite is not a constant. For example, with reference to FIG. 30, it depends on inclination of orbital plane and position of the ground station that defines its elevation angle w.r.t earth to point the ground station antenna at the satellite. Given the parameters of elevation, from the following equations, the variation in R, elevation, footprint and visibility duration can be obtained from the following relations:

$$\text{Earth central angle } \varphi = \frac{\pi}{2} - \vartheta - \varepsilon$$

$$\text{Nadir angle } \vartheta = \arcsin\left(\frac{Re}{r} \cos \varepsilon\right)$$

$$\text{Elevation } \varepsilon = \arccos\left(\frac{r}{Re} \sin \vartheta\right)$$

-continued $$\text{Distance } d = \sqrt{Re^2 + r^e - 2Re\ r\ \cos\varphi}$$

Coverage length $DA = 2\ \varphi max\ Re$

Visibility time $Tvis = \dfrac{\pi \varphi max}{\pi} T$

Figure 31:
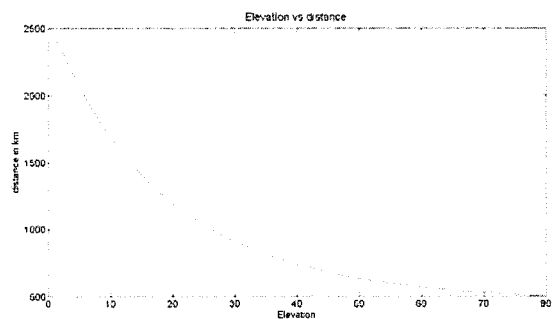
FIG. 31 shows a plot of variation of path length with elevation, according to one embodiment of the present invention.
Figure 32:
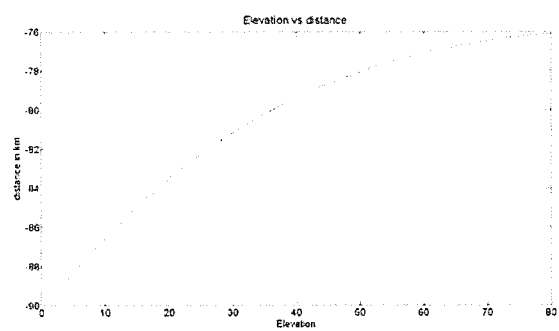
FIG. 32 shows a plot of variation of path loss with elevation, according to one embodiment of the present invention.

Referring to FIG. 31, from the plot it can be seen that as the elevation angle increases the path length changes. A variation of about 10 dB in loss is noticed for an antenna pointing at zenith to that when it is pointing at horizon. Referring to FIG. 32, from the plot it can be concluded that the path loss variation is about 3 dB lower than when it is pointing at zenith. This can be considered as criteria for power budget of transmission given the knowledge of satellite position with respect to the ground station. Antenna designs are developed to compensate this variation as shall be covered later.

Path loss is also affected by the radiation pattern of the antenna and in specific the gain profile of the antenna. Antenna gain is not constant throughout its profile and the signal strength of the received signal would depend on the region of radiation pattern the ground station antenna is pointed to. The figure captures one such scenario for a radiation pattern where in the ground station antenna is pointed to a region with gain of 3 dB lower than peak value. This happens when the footprint of the antenna with respect to 3 dB beam width would overlap the peak gain of ground station antenna. Thus the received power would be 3 dB lower than at zenith. Hence the same set of antenna on the satellite would have additional path loss due to radiation pattern.

Foot Print and Coverage

Figure 33:
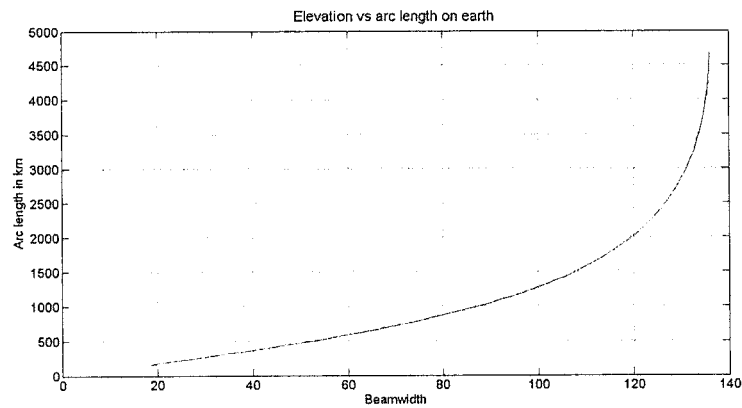
FIG. 33 shows a plot of the variation of arc length coverage with beamwidth, according to one embodiment of the present invention.

Antenna beamwidth affects the coverage of a satellite. In case of a patch antenna with uniform cosine radiation pattern with beam width of 60 degrees the coverage is about 600 km. Beam width depends on antenna gain and eventually would define the system performance. FIG. 33 shows a plot of the variation of arc length coverage with beamwidth.

It can be seen that the beam width of 60 degrees corresponds to a footprint of 800 km that correspond to an elevation of thirty degrees, thus the region of reasonable received power is about 30% of the overall visibility period. The above calculation considers an overhead pass of satellite on the ground station. But if the pass is towards the horizon, then the region of radiation pattern covering the ground station may not have high gain and also have increased distance R, thus leading to low link quality. This problem can be overcome by using antenna diversity and power control mechanism discussed later.

Figure 34:
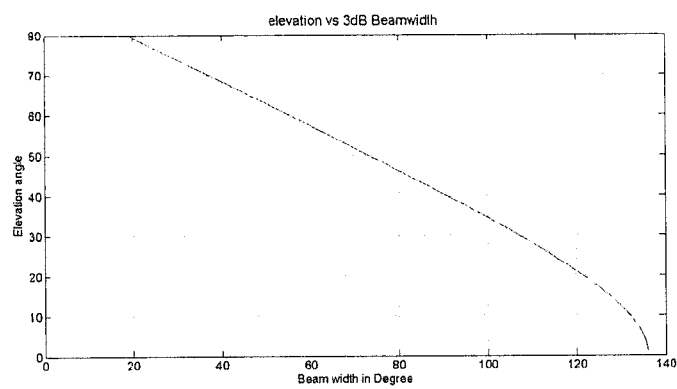
FIG. 34 shows a plot of the relation between antenna beam width and elevation angle, according to one embodiment of the present invention.

The beam width of antenna can define the maximum elevation angle to be used for communication. The relation between antenna beam width and elevation angle is shown in FIG. 34. Through careful design of satellite antennas, this coverage can be increased to provide better gain and increased duration of good reception. The designs are discussed later.

Overall Bandwidth

The overall effective bandwidth of the communication link depends on the factors of elevation, radiation pattern spatial profile, coverage and footprint of the antenna. The bandwidth as seen from the relation of sensitivity would change proportionally with change in the signal strength. Moreover at the horizon the noise figure is more than when in zenith. Hence, the bandwidth available is not constant throughout the visible period of satellite. The peak is at the zenith and lowest at horizon. A more sophisticated analysis should be considered to bandwidth availability and the power requirement to overcome the drawbacks.

Antenna Design Considerations

The power requirement on the satellite can be minimized by using a high gain antenna on the satellite. A 3 dB raise in gain can minimize the transmission power by an equal amount. Also, the antenna pattern defines the footprint or the ground coverage of the antenna. For a beam width of 10 degrees, the gain can be obtained as 21 dB. Through careful design considerations, antennas can be designed to provide a bandwidth of 40 MHz with high gain and a wider foot print such that the coverage of antenna is more. Apart from these parameters, the antenna design should be compact and such that we can package it easily onto the body of satellite. One of the aspects to explore would be to create high gain antennas that can be packaged and released from the satellite. Several antenna designs are considered here each one with different gain and ability to be packaged onto the satellite. The gain and beam width information on each antenna is provided along with Electromagnetic Simulation results and impedance measurements.

Antenna Designs

Reflector Antenna

Figure 35:
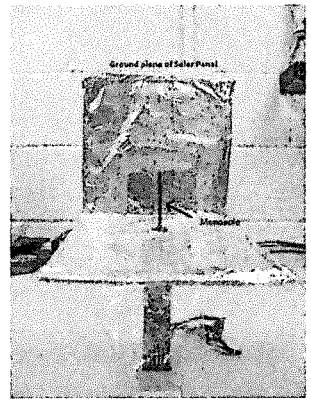
FIG. 35 illustrates an example reflector antenna arrangement, according to one embodiment of the present invention.
Figure 36:
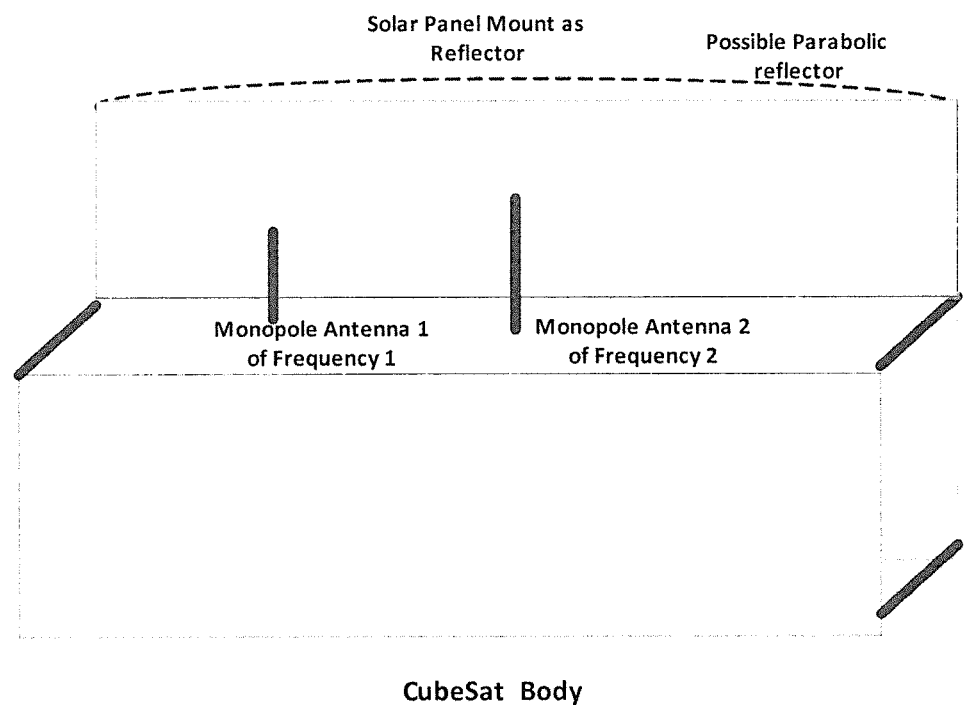
FIG. 36 illustrates an example reflector antenna arrangement on a CubeSat body, according to one embodiment of the present invention.
Figure 37:
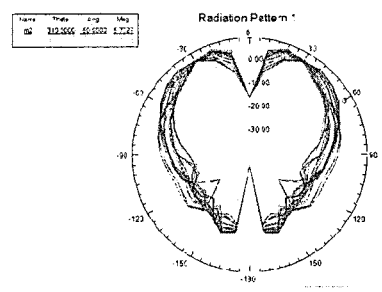
FIGS. 37-38 shows example radiation patterns of a pseudo parabolic patch antenna, according to one embodiment of the present invention.
Figure 38:
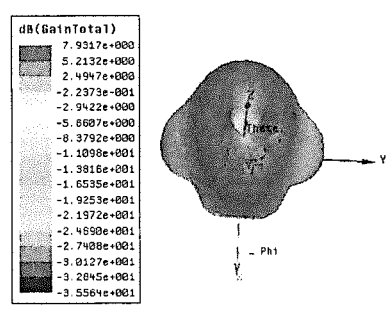

A monopole has gain of about 1.65 dBi that can be increased by placing it on a large ground plane. But this gain can further be increased to 6 dBi by placing a reflector behind the monopole. The size of this reflector defines the gain. For a 3U Cubesat, the solar panel ground mounted on one of the sides can act as a reflector of 30 cm×10 cm dimension. The setup for the antenna may be as shown in the FIGS. 35 and 36 with radiation patterns as shown in FIGS. 37 and 38.

Figure 39:
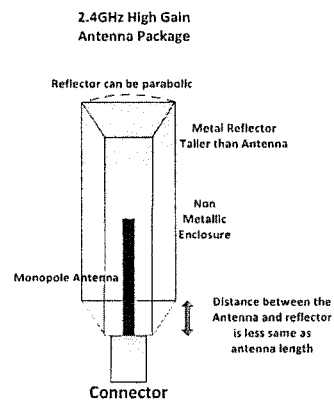
FIG. 39 illustrates an example monopole with a reflector antenna, according to one embodiment of the present invention.

This antenna has a beam width of 60 degrees and gain of 7.5 dBi. This kind of configuration can be extended to antenna arrays to do beam forming for applications like proximity sensing and collision avoidance. This antenna can be packaged as a product for commercial use. The details of its packaging may be shown in the FIG. 39.

Pseudo Patch Dish Antenna

Figure 40:
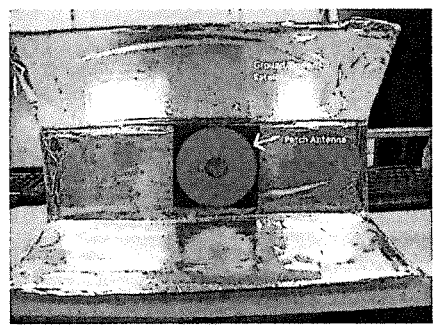
FIG. 40 illustrates an example patch antenna arrangement on a CubeSat for high gain, according to one embodiment of the present invention.

In some embodiments, the body of a satellite can be used as ground for a 3U satellite configuration. Some of the 3U configurations have deployable solar panel. This can be exploited to generate more power and increase antenna gain by inclining the metal structure. In some embodiments, the concept can be extended to other forms of directional antenna (e.g., rectangular patch, planar inverted F, etc.) that have a wider beamwidth and are directional. An example antenna setup is shown in FIG. 40.

Figure 41:
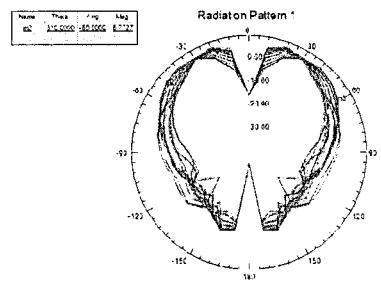
FIGS. 41-42 show example radiation patterns of a patch antenna arrangement on a CubeSat for high gain, according to one embodiment of the present invention.
Figure 42:
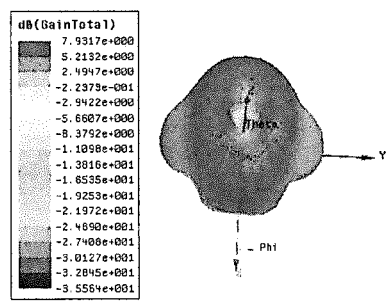
Figure 43:
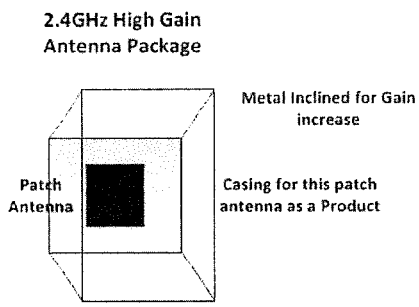
FIG. 43 illustrates an example patch antenna package, according to one embodiment of the present invention.

The experimental antenna setup consists of 4.5 dBi gain annular ring path antenna placed at the middle of one of the sides with other two sides inclined. The inclination improves the gain and the overall structure acting as ground helps attain a gain of 7.5 dBi. The antenna has a beamwidth of 80 degrees. The radiation pattern is as shown in FIGS. 41-42. This antenna can be packaged as shown in the FIG. 43, to form a commercial product.

Parabolic Reflector Antenna

Figure 44:
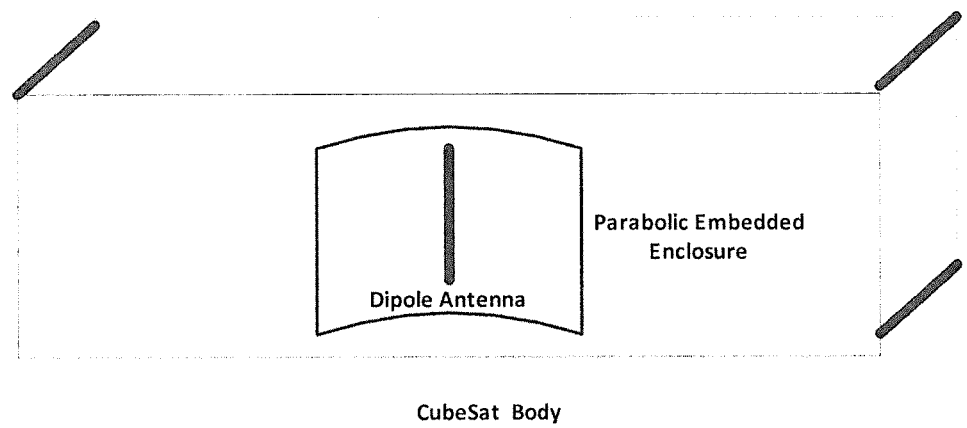
FIG. 44 illustrates example placement of a parabolic antenna on a CubeSat to increase gain, according to one embodiment of the present invention.

Parabolic reflector antennas are one of the common and simplest designs of antenna. This antenna consists of parabolic dish placed behind a radiation element like monopole or dipole. This kind of antenna provides high gain and at the same time a wider beam width as can be seen the plot. The setup of the antenna is as shown in FIG. 44. The dimension is such that it can easily fit inside a 3U CubeSat. The gain is 9 dB.

Figure 45:
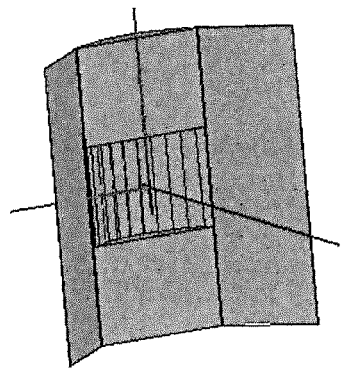
FIG. 45 illustrates an example parabolic antenna packaging on a 3U for high gain, according to one embodiment of the present invention.
Figure 46:
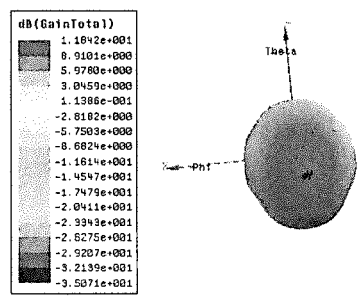
FIG. 46 illustrates performance of a parabolic antenna positioned according to FIG. 44, according to one embodiment of the present invention.

The gain of this antenna can be improved by placing it at the centre of the longest side of 3U satellite which can further be increased by using a configuration shown in the figure employing deployable antennas. From simulation it is seen to have a gain of about 12 dBi and a beamwidth of 50 degrees. By packaging the antenna carefully we can attain a higher gain with deployable solar panels to form a Pseudo Parabolic dish as shown in FIG. 45. Instead of dipole antenna a monopole can also provide a better performance as shown in FIG. 46.

Antenna Test Setup

Figure 47:
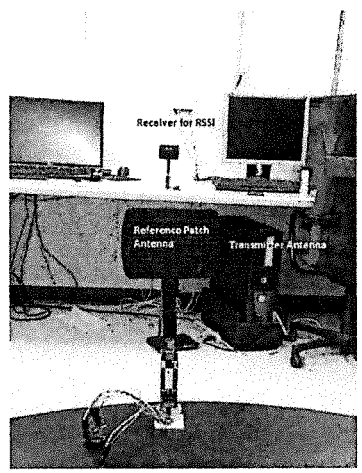
FIG. 47 illustrates an example setup for antenna measurement, according to one embodiment of the present invention.

The test setup is a simple and smart approach to find antenna gain. The setup consists of the following components and is illustrated in FIG. 47:
1. Microcontroller: MSP430.
2. Transceiver: At86RF231 with antenna diversity.
3. Antenna: Patch antenna dish, Reflector monopole antenna, parabolic antenna, Beam Diversity patch antenna array, Reference Patch Antennas.

There are two subsystems with the microcontroller and transceiver with one for transmitter and other for receiver. The transmitter is used to send the test data that is recorded on the receiver and the corresponding RSSI level is measured. To start the test, the two 2.4 GHz patch antennas with known gain of 7 dBi are used to perform measurements. The gains of new antennas are measured relative to these antennas just as it done in a standard antenna test system. The following images show the setup and their corresponding antennas under test (AUT).

From the test it is noticed that each of these antenna setup shows a 3 dB gain improvement over the actual antenna that does not exploit the CubeSat body for gain improvement.

Antenna Diversity for Path Loss Compensation

In the earlier section it was discussed that as the satellite is positioned at elevation lower than 30 degrees, we would see that the path loss is 3 dB more than zenith. This problem can be handled by using: Antenna Diversity technique and Antenna Array.

Figure 48:
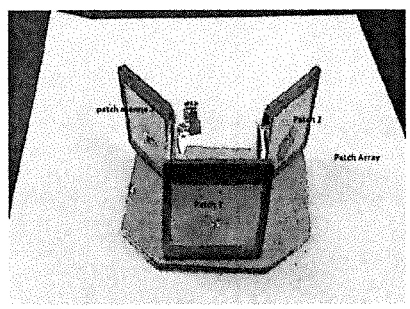
FIG. 48 illustrates an example packaging for patch array diversity for increased coverage, according to one embodiment of the present invention.
Figure 49:
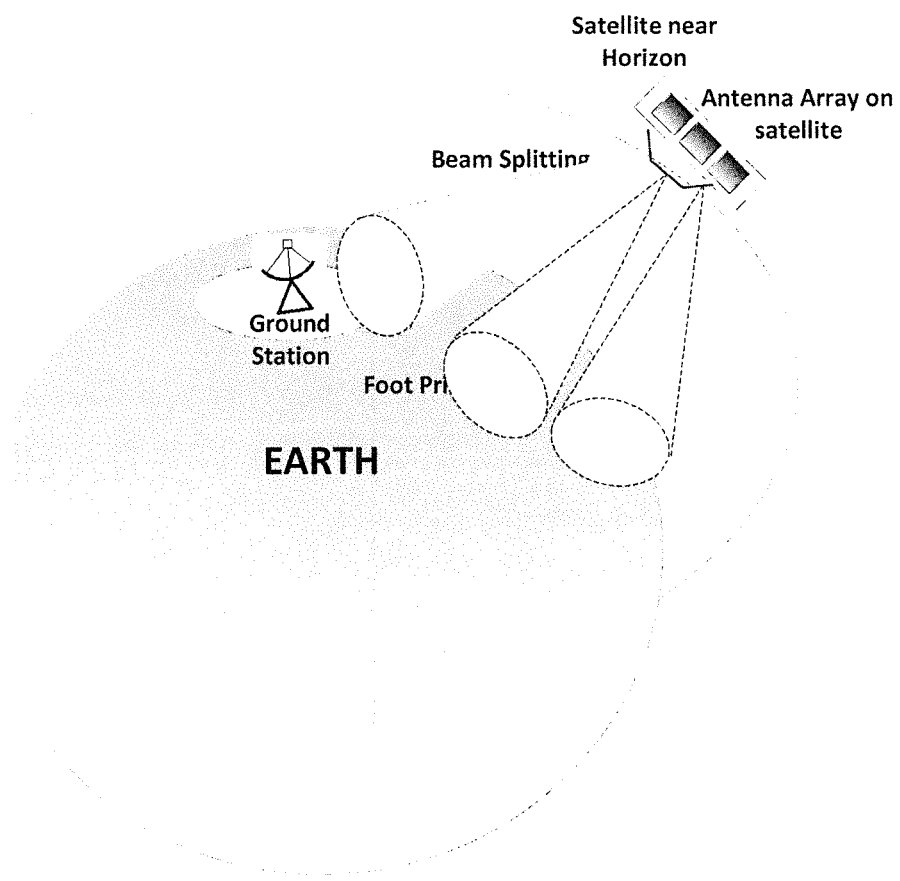
FIG. 49 illustrates the coverage improvement of an example embodiment with a patch array, according to one embodiment of the present invention.

The antenna diversity setup consists of three antennas each one with beam width of 60 degree, thus overall beam width is about 150 degrees due to the inclined configuration of the patch. The factor to consider is the 3 dB beam width. Each of the elements is connected to a diversity switch that is connected to transceiver at one end and the antenna at the other end. The transceiver and the switching are controlled from microcontroller. The gain of each antenna is about 8 dBi. Software controls the power amplification level fed to each antenna. The antennas at corners have a power level that is 3 dB higher than at middle. The reason being that these antennas are used for communication when the satellite is off the zenith at towards horizon where in the distance to the satellite from ground station is about 3 times higher than when at zenith. This is about 5 dB more than when in zenith and hence 5 dB more path loss. The switching between the elements is carried out based on the position on orbit. The setup shown in FIG. 48 consists of patch antenna fabricated on a Roger 5880 substrate with a dielectric of 2.2 and thickness of 62 mils. The individual elements have a gain of 8 dB and bandwidth of about 80 MHz as obtained from the simulations. The beam width of this antenna is about 60 degrees that corresponds to a foot print of about 1000 km. Even with two antenna elements, this kind of technique can be employed. One of the aspects to consider is the packaging method. Packaging arrangements are shown in FIG. 48. An example antenna diversity setup with illustration of the beam widths is shown in FIG. 49.

Figure 50:
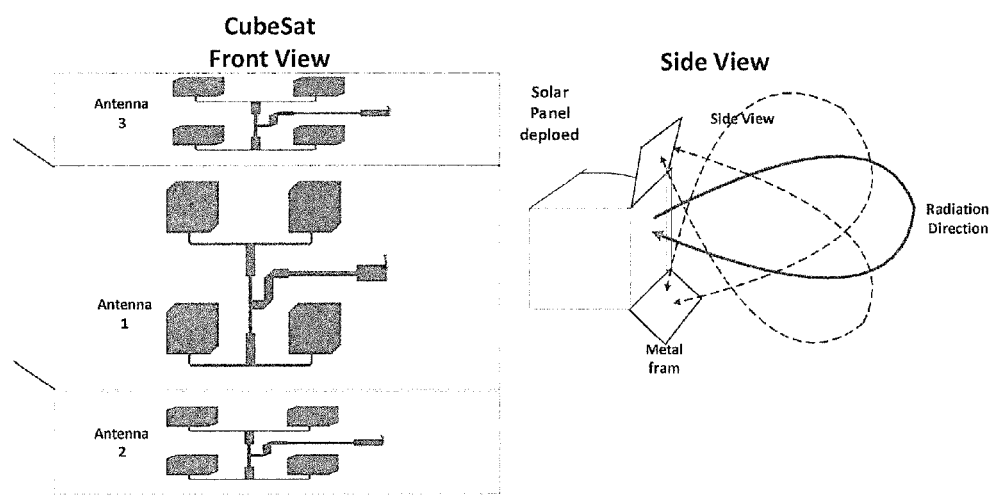
FIG. 50 illustrates an example 3D antenna arrangement and corresponding coverage area, according to one embodiment of the present invention.
Figure 51:
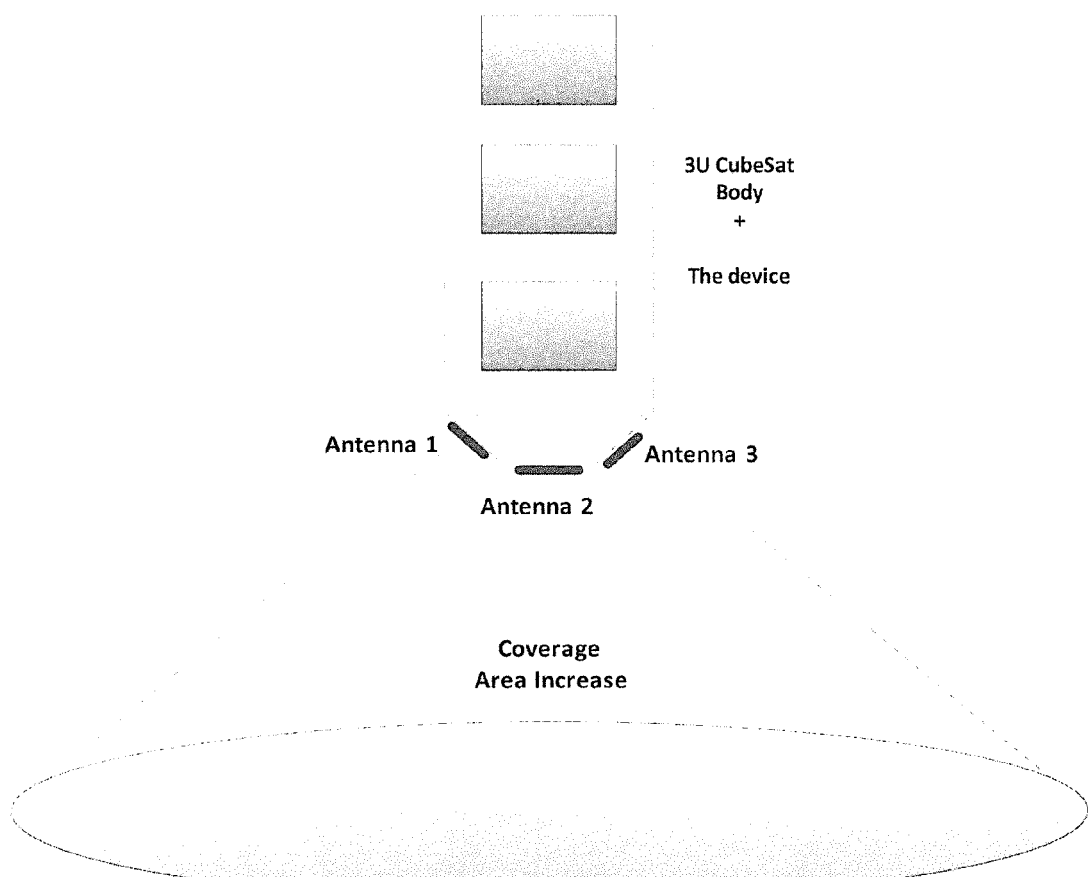
FIGS. 51-52 illustrate other examples of 3D antenna arrangements and corresponding coverage areas, according to one embodiment of the present invention.
Figure 52:
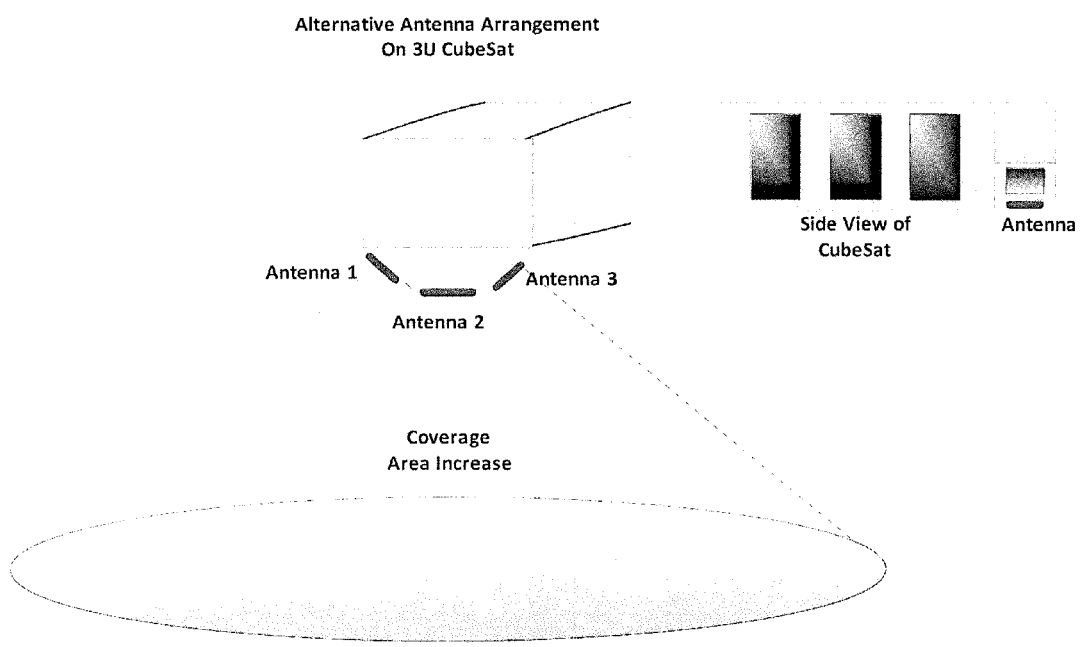

Instead of a single antenna, each side can have antenna array such that the foot print is wider. An alternative arrangement would be that of placing the antenna on the backside of solar panel structure such that the panels are inclined. Each panel holds a patch antenna or array of directive elements focused onto to different locations on ground. Based on satellite position, the corresponding elements are selected. Some example embodiments of antenna arrangements and coverage areas are illustrated in FIGS. 50-52.

A Nano-Satellite Constellation for Advanced Fire Detection

This report discusses the results of a study on the capabilities of a constellation of CubeSat form factor satellites that yields improved temporal and spatial resolutions over the tropical/sub-tropical regions of the Earth for advanced fire detection (AFiD). Using the maximum revisit time as a requirement, a constellation of twenty-seven satellites, evenly distributed between three planes (i.e., nine satellites per plane), was devised by minimizing the number of satellites for a set inclination. With this constellation of CubeSats the revisit time was approximately less than one hour. Visible spectrum sensors could yield spatial resolution of approximately 25 m. In order to implement the constellation in a timely manner and potentially minimize the overall cost and risk, a fractionated systems approach was evaluated in this study. Staged constellation deployment and phasing methods have been investigated and are discussed. Small satellite subsystem design is discussed in order to highlight the feasibility of this mission.

Remote sensing is a technology solution particularly well suited to challenges such as climate change, resource management, and disaster monitoring. Environmental changes such as the depletion of the ozone layer, global warming, deforestation, acid rain, and the extinction of species all have one commonality—wildfires. Destruction from fires is not restricted to a single region or country, nearly all biomes experience the devastation caused by wildfires. The USDA Forest Service Moderate Resolution Imaging Spectroradiometer (MODIS) Active Fire Mapping Program provides daily fire detection to the entire continental United States. The rationale for MODIS grew from the catastrophic wildfire season of 2000. Fire detection is also the third highest priority item for the African Resource Management (ARM) satellite constellation. Thus this paper discusses the use of a constellation of nano-satellites for improved spatial (~25 m) in the visible spectrum and temporal (~30 mins updates) for fire detection over the subtropical/tropical region and the feasibility a fractionated approach to multi-spectral imaging on a CubeSat platform.

Technical Description of Fire Detection System

Fires are a natural part of life on Earth, but they also have the capacity to be disruptive to human infrastructure and life itself. There are several remote sensing projects already in use or development for fire detection. For example, the Metoesat Second Generation (MSG) satellites are located in geostationary orbits and provide multi-spectral imaging with 15 minute temporal resolution and up to 3 km spatial resolution (1 km in visible spectrum) data that yields hot spot data for fire detection. Due to the high attitude of MSG, the resulting data spatial resolution is coarse, however the geostationary orbit does allow for medium temporal resolution.

Also in development is the HumSAT project, which is a constellation of nano-satellites aiming to provide worldwide communication capabilities to areas without infrastructure.

As stated above, the United States has increased its efforts in the last decade to provide greater fire detection to the entire country, not just the western states. The Active Fire Mapping Program uses data gathered by the MODIS sensor aboard the Terra and Aqua satellites. MODIS has spatial resolution of 500 m in the near infrared and 1 km in the thermal infrared portions of the spectrum, which do not satisfy medium spatial resolution criteria.

In an effort to respond to, and even prevent, disastrous wildfires, certain systems are already in place, such as the South African Advanced Fire Information System (AFIS), which utilizes data from MSG as well as remote sensing data from MODIS. The combination of data acquired from both sensors is intended to help locate fires quickly, but could have the unintended consequence of inaccurately predicting fire location due to the mismatch in spatial resolutions. AFIS collects remote sensing data on 'hotspots' and compares the black-body temperature of a pixel to its neighboring pixels, then it alerts users to possible fire events that occur near infrastructure, such as power lines.

Fractionated System Solution and Constellation Design

Fractionated systems provide a low-cost solution to fire-detection demands by distributing the multi-spectral imaging capability of satellites such as MSG into several smaller satellites with only one spectral band per satellite. When in a constellation, these fractionated satellites can provide both medium-resolution spatial and temporal sensor data.

In order to reduce the costs and reduce the overall complexity of each satellite a fractionated system is proposed. Fractionated satellite systems enable rapid initial operations via staged deployment and robustness single point failures. The AFiD constellation implements a fractionated system with multiple, heterogeneous satellites. Since there are nine satellites per plane it is proposed to inject three visible (VIS) spectrum satellites, three thermal infrared (TIR) spectrum satellites, and three mid-wave infrared (MWIR) spectrum satellites into each plane. The three types of sensors are intended to replicate a single multi-spectral imaging sensor. In order to do this the VIS, TIR, and MWIR sensor satellites are, as stated above, spaced 10° apart, the satellite orbital elements are given in Table 2.

TABLE 2

Satellite Orbital Elements

| Orbital plane | Plane 1 | Plane 2 | Plane 3 |
|---|---|---|---|
| Altitude (km) | 390 | 390 | 390 |
| Inclination (°) | 35 | 35 | 35 |
| RAAN (°) | 0 | 120 | 240 |
| True Anomaly (°) | Sats 1-9: 0, 10, 110, 120, 130, 230, 240, 250, 350 | Sats 1-9: 70, 80, 90, 190, 200, 210, 310, 320, 330 | Sats 1-9: 30, 40, 50, 150, 160, 170, 270, 280, 290 |

Figure 53:
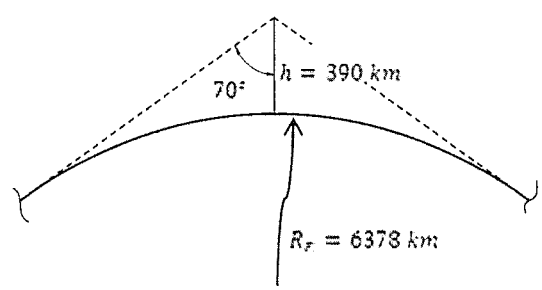
FIGS. 53-54 illustrate maximum slew angles, according to one embodiment of the present invention.

In order to obtain complete information in all spectral bands about any point of interest, satellites carrying different spectral bands must be able to image that area of interest in the same pass. It is assumed that the satellites have 3 axis attitude control system, thus they can point the imaging system anywhere on the visible surface of the Earth. The maximum slew angle is limited by the altitude of the satellite. For the altitude of 390 km, the maximum slew angle is 70° as shown in FIG. 53.

Figure 54:
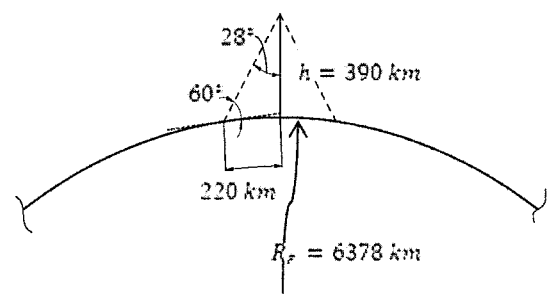

However, at the maximum slew angle, the line of sight of the satellite is tangential to the surface of the Earth which makes imaging impossible. Assuming that the imaging is possible only if the line of sight makes an angle of 60° or less to the surface of the Earth, the maximum practical slew angle is 28°. Within this slew angle, the satellite can image any point of interest within 220 km from nadir as shown in FIG. 54.

The angular speed of the earth is $7.29*10^{-5}$ rad/s which translate to the equatorial surface speed of 465 m/s. If we assume that the first and the last satellite in the group slews by 28° and the middle satellite always points in the nadir direction, the imaging by all 3 satellites must happen within 940 seconds. At 390 km orbit, this translates to the angular separation of 60° between first and last satellite. Thus, each satellite in the group must be spaced less than 30°. The 30° spacing is considering middle satellite is always nadir pointing. However, if an off nadir feature is to be imaged, either leading or trailing satellite will not be able to capture that. Thus, a more practical spacing between satellites is 10° which enables up to 17° off nadir multi-spectral imaging.

Figure 55:
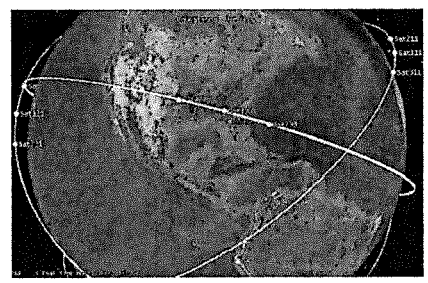
FIG. 55 illustrates an example satellite constellation setup, according to one embodiment of the present invention.

In order to get the revisit time necessary for fire detection the constellation required more than one orbital plane. Since there are three multi-spectral satellites that image together the number of satellites per plane needed to be a multiple of three. It was also determined that in order to keep the launch cost low there should be no more than three orbital planes. Constellation simulations were run via STK for a constellation of nine satellites, eighteen satellites, and twenty-seven satellites and it was found that a constellation with three orbital planes, nine satellites per plane, with a total of twenty-seven satellites in all, as shown in FIG. 55 would give the required revisit time of less than 30 minutes.

In order to avoid interfering with the International Space Station during the constellation's end of life scenario it was decided to insert the AFiD constellation into a 390 km orbit. However, at low altitudes a major concern is orbital lifetime. Hence an orbital lifetime analysis was performed the Naval Research Laboratory Mass Spectrometer and Incoherent Scatter Radar Exosphere 2000 atmospheric density model is used as an estimate of density and it was found that the lifetime was on the order of eight months. To extend the life of the constellation the delta-v calculations for altitude maintenance were done and propulsions options were explored, more detail will be given on this in the next section.

Launch Provisions and Delta-V Budget

In order to populate the AFiD constellation, the 27 satellites must be inserted into the 3 separate planes with appropriate phasing. Due to the 120° separation of the planes, a single launch would require a prohibitive delta-v for the large-angle plane changes. Therefore, a staged launch schedule is proposed, where each launch vehicle inserts a set of 9 satellites into each plane. However, it should be noted that due to the fractionated nature of the system, the constellation is robust to high probability external factors that can result in delays or less satellites deployed per stage. The 9-satellites are then appropriately phased using onboard propulsion. Phasing maneuvers are feasible because of the trade-off of delta-v and number of revolutions to phase the satellites. For the proposed fire identification mission, the time it takes to phase the satellites is not a critical factor. Therefore, the delta-v can be ensured to be small, even for large phasing angles, but a trade-off exists in minimizing the delta-v requirements and mission life. Finally, the CubeSats will be subjected to a resistive drag force due to the atmosphere, which is the dominant perturbation in low Earth orbit (LEO).

In order to maintain the constellation during the operational life on-board propulsion will be required to counteract this orbital decay with periodic impulsive burns.

Orbital Phasing Maneuvers

There are two primary sets of phasing maneuvers necessary to construct each plane of satellites, where phasing is accomplished by a series of circular coplanar maneuvers. First, the 120° phasing is accomplished by two successive leading orbital interception maneuvers (via the upper stage of the launch vehicle), which is necessary to position each set of distributed imagers. Then the distributed imager CubeSats are deployed and similarly phased via their onboard propulsion using a leading and trailing 10° orbital interception maneuver. The phasing maneuver delta-v requirements are found through the impulsive maneuver described by $$\Delta v = 2 \left| \sqrt{\frac{2\mu}{r} - \frac{\mu}{a_{phase}}} - \sqrt{\frac{\mu}{r}} \right|, \quad (1)$$

where $\mu$ is the Earth's gravitational parameter, r is the position of the satellite measured from the center of the Earth, and $a_{phase}$ is the phasing orbit semimajor axis given by $$a_{phase} = \left[ \mu \left( \frac{2\pi k_{tgt} + \Delta\theta}{2\pi k_{int}\omega_{tgt}} \right)^2 \right]^{1/3}. \quad (2)$$

The phasing orbit is an elliptical orbit with semimajor axis described by the phasing angle, $\Delta\theta$, the number of revolutions of the target, $k_{tgt}$, a sizing parameter, $k_{int}$, and the angular velocity of the target, $\omega_{tgt}$. Logistically, the delta-v for the 120° phasing will be accomplished with an upper stage such as a restartable hydrazine auxiliary propulsion system (HAPS), which is available as an optional upper stage for the Pegasus rocket. Each CubeSat will then utilize an onboard propulsion system to supply the delta-v for the 10° phasing maneuver, as well as the necessary station keeping.

Due to the CubeSat's limitations on size, weight, and power (SWaP), single revolution phasing maneuvers, although fast, require fuel that could be better served performing station-keeping maneuvers. Hence, there is a tradeoff between the decrease in mission life due to the phasing maneuvers and the mission life gained through station keeping. A single revolution 120° and 10° phasing maneuver consumes 2.603 km/s and 138.3 m/s of delta-v, respectively. A solution that balances the mission life and delta-v requirements is found by using a 15-revolution ($k_{tgt}=k_{int}=15$) phasing orbit for both the 120° and 10° phasing maneuvers. The multiple revolutions bring the delta-v requirements down to 111.2 m/s and 9.547 m/s, respectively. This is a significant savings in fuel at only the cost of approximately 1 day. Further analysis will optimize $k_{tgt}$ and $k_{int}$ to maximize the mission life for a given propulsion technology or explore the minimum delta-v requirement to achieve a specified mission life.

Constellation Station-Keeping Maneuvers

Atmospheric drag is the dominant resistive force that causes orbital decay. The acceleration due to drag is $$a_D = \frac{\rho v^2 C_D A}{2m}. \quad (4)$$

Altitude maintenance is crucial to extending the life of the AFiD constellation in LEO. In order to choose an onboard propulsion system it is necessary to calculate the change in velocity per satellite revolution using $$\Delta v_{rev} = \pi (C_D A/m) a \rho V, \quad (5)$$

where $C_D$ is the drag coefficient, A is the cross-sectional area of the satellite perpendicular to the direction of motion, m is the satellite mass, a is the semi-major axis of the orbit, $\rho$ is the density at altitude, and V is the satellite velocity. Representative parameter values for a 3U CubeSat that is longitudinally aligned with the velocity vector are tabulated in Table 3.

TABLE 3

Satellite Parameters

| Parameter | Value | Units |
|---|---|---|
| $C_D$ | 2.2 | — |
| A | 0.01 | m² |
| m | 4.0 | kg |
| a | 6768E3 | m |
| $\rho$ | 7.55E-12 | kg/m³ |
| V | 7.669E3 | m/s |

Delta-V Budget

Using Eq. (4) and the satellite parameter values given in Table 3, the phasing delta-v requirements for the HAPS and CubeSats are computed. The HAPS requires 222.4 m/s of delta-v to phase the distributed images within 15 orbits (approximately 1 day). Each CubeSat requires less than 10 m/s for the associated imager phasing.

Using Eq. (5) and the values of Table 3, the delta-v per orbital revolution for station keeping is 0.007 m/s. Therefore, given an orbital period of 92.35 min, the delta-v for one year of station keeping is 39.84 m/s.

The delta-v budget for the AFiD is shown in Table 4.

TABLE 4

Constellation maneuvering Δv budget

| Body | Maneuver Type | Maneuver Δv (m/s) | #/plane | Combined Δv (m/s) |
|---|---|---|---|---|
| HAPS | 120° Phasing | 111.2 | 2 | 222.4 |
| Leading CubeSat | 10° Phasing | 9.457 | 3 | 28.37 |
| Trailing CubeSat | 10° Phasing | 9.492 | 3 | 28.48 |
| All CubeSats | Station Keeping (1 year) | 39.84 | 9 | 358.5 |
| | Totals/plane | — | — | 637.8 |

Propulsion Options

With SWaP constraints in mind, several propulsion options were studied, including cold gas thrusters, micro-Hall thrusters, micro-ion thrusts, colloidal thrusters, micro-butane, and field emission electric propulsion. For a 3U CubeSat SWaP constraints are 30 cm×10 cm×10 cm, 4 kg, and 20 W, respectively. Ultimately, due to the mass and power constraints a field emission electric propulsion (FEEP) thruster system was chosen for several reasons, such as low mass, power input within the constraint, emitter dimension that fit within the form factor. Most importantly it also has sufficient thrust to maintain altitude and it is not pressure fed as propellant is supplied via capillary forces, making for a compact design featuring no pressurized tanks or valves.

To date no small satellite has flown with a propulsion system to accomplish the delta-v maneuvers that are necessary for the proposed AFiD mission. Yet as the capabilities of small satellites grow, such as the AFiD constellation mission, it is apparent that propulsion will be necessary for the purposes of altitude maintenance an orbital phasing.

Small Satellite Conceptual Design

The primary objective of the proposed constellation is an on-orbit capability to achieve both medium temporal and spatial resolution on a low-cost platform suitable for developing nations. With a spatial resolution requirement of 25 m in the visible spectrum, and at the altitude of 390 km, the sensor angular resolution per pixel is approximately 10 arc-seconds. These imaging requirements, along with the SWaP constraints imposed by the CubeSat form factor, are the driving factors for the design and selection of each satellite's subsystems.

A CubeSat is composed of several subsystems that provide the necessary functions for mission operations. These subsystems include the structural and thermal, attitude determination and control, power, communications, and command and data handling.

Structures and Thermal

The frame of the satellite must be able to provide thermal stability over a wide temperature range as well as maintain structural rigidity, demanded by the imaging system. All the CubeSats flown to date, or being designed, make use of an aluminum structure. For a mission with stringent tolerances, carbon fiber composites may provide a structure that ensures tolerances are maintained over the entire operational temperature range. However, active thermal management systems cannot be used due to size and power constraints.

Attitude Determination and Control

Most CubeSats lack precision attitude determination and control systems. Typically, magnetic coils are used to dump residual angular momentum after the satellites are deployed, but precision 3-axis attitude control is uncommon. Coarse attitude determination has been achieved using sun sensors and a magnetometer. For the imaging application, precision attitude determination and control, on the order of a few arc seconds is required.

High precision systems are already being developed and are expected to mature to acceptable TRL levels within a few years. Star trackers capable of providing 0.01° accuracy are already commercially available. Integrated Attitude control systems are also being developed. One such system is by Pumpkin Inc. and is capable of providing 1-3 arc sec pointing accuracy with ring laser gyros and a star tracker. Similar form factor reaction wheels are under development by Sinclair Interplanetary. However, control moment gyroscopes (CMGs) are better suited for the CubeSat platform since they operate at a single frequency and thus can be passively isolated. The Space System Group at University of Florida has developed CMG based attitude control system which will be flown on their CubeSat, SwampSat, in 2012. GPS systems that are capable of providing position as well as velocity are also available for the CubeSat form factor.

Electrical Power System

The required average on-orbit power is approximately 20 watts. Various options are available for deployable solar panels that can meet this demanding requirement. Clyde Space has deployable panels for 3U and 6U CubeSats capable of generating maximum power of 29 and 75 watts, respectively. They also have batteries suitable for this type of mission. Therefore, a 3U CubeSat feasible, however a 6U form factor is also an option as a risk mitigation contingency for power and volume limitations imposed by the imaging system.

Communication System Design

The communication system design is governed by bandwidth requirement. A preliminary analysis to estimate the bandwidth requirements for the entire duration of image capturing was performed. The image sensor is assumed to be 1×4000 pixel array scanned using 10 bit analog to digital converter. This leads to about 4.7 Kbytes of data per capture. Assuming a ground speed of about 7404 m/s we have the time during for 25 m area scan as 0.003 sec that leads to image sampling rate of about 296 Hz that leads to 177 ksamples accumulated in 10 min duration. Thus data acquired per second is about 1.412 Mbytes per second. Thus over a period of 6 min for the 3 image channels (Red, Green, Blue) we have about 2543 Mbytes of data to be transmitted within 10 min duration that leads to an estimated data rate of transmission to about 33 Mbits per second. For a modulation scheme of QPSK, this translates to a 33 MHz channel bandwidth requirement. Hence, as indicated in the FCC frequency spectrum allocation chart, the ITU has a band in the region of 2.2 GHz to 2.29 GHz range assigned for space to Earth communication. Thus, we shall assume a center frequency of 2.25 GHz for our application.

One of the primary factors governing the design of any wireless communication link is the signal power to noise power ratio of received. Similar to any wireless communication link, the signal strength is primarily affected by the propagation distance between ground and satellite as given by the general form of Friis Free Space path loss equation. The atmospheric conditions like humidity and ionization also adds to the loss during propagation. Apart from this, there are losses associated with antenna polarization mismatch between transmit and receive antennas, the loss due to impedance mismatch and also the connector losses. Using a circular polarized antenna on the receiver side can minimize polarization losses. Taking all these parameters into consideration, the modified Friis equation is $$Pl = Gt + Gr + 20 \log_{10}\lambda - 20 \log_{10} 4\pi R - A - P - 10 \log(1-|\gamma|^2)$$

where, Pl is the propagation loss, $\lambda$ is the wavelength from 13 cm at 2.25 GHz, R is the distance that is about 390 km, A is the atmospheric loss that is approximately 2 dB at 2.2 GHz, P is the polarization loss of approximately −2 dB, and $\gamma$ is the reflection coefficient assumed to be −20 dB. Gt is the satellite antenna gain that is set to 8 dB similar to that of a patch antenna. Gr is the gain of parabolic antenna of the ground station whose gain is $$G = 10\log_{10}\left(\eta\left(\frac{\pi D f}{c}\right)^2\right),$$

where D is the diameter of the antenna, f is the frequency, c is the speed of light: $3 \times 10^8$ m/s, and η is the efficiency assumed to be approximately 0.8%. For a diameter of 2 m the gain is the parabolic dish, the gain is 36 dB. Taking all these parameters into consideration, the path loss is about −113 dB.

Image transmission generally requires a low Bit Error Rate (BER) and hence the sensitivity (S) requirement for the receiver increases and is $$S=10 \log(kT_{sys})+10 \log B+SNR+NF,$$

where K is the Boltzmann constant, $T_{sys}$ is the system noise temperature, SNR is the signal to noise ratio of 9.2 dB required to attain a figure of $10^{-6}$ Bit Error Rate for QPSK modulation scheme, B is the bandwidth, which is the same as the transmission data rate for QPSK (i.e., 33 MHz), and NF is the noise figure assumed to be 3 dB. The sensitivity required is −117 dB. For a path loss of −113 dB the transmission power required to achieve the above obtained sensitivity is about 1 W.

Antenna characteristics of footprint, gain and efficiency contribute significantly towards the performance of a wireless communication link. It defines the bandwidth and power requirements for satellite transponders. Signal and noise level for the ground station receiver depends on the antenna elevation angle. Friis free space path loss equation shows the variation of signal strength with distance and this affects the available channel bandwidth.

The value of R is not a constant due to the satellite movement. It is shortest when the satellite is at zenith and farthest when satellite is at horizon. This leads to a signal strength variation of more than 7 dB. Thus, to achieve a desired signal strength level to communicate with satellite at horizon, we need 7 dB more power i.e., 5 times more power than when it is in zenith. To reduce this huge variation, we shall restrict communication with satellite to elevation between ±30° that gives a 3 dB variation of signal strength. Moreover, the spatial distribution of antenna gain is not a constant. Gain depends on the position at which it is measured with respect to the antenna radiation pattern. This leads to a non-uniform link quality as the satellite passes over the ground station and hence a varied channel bandwidth.

Figure 56:
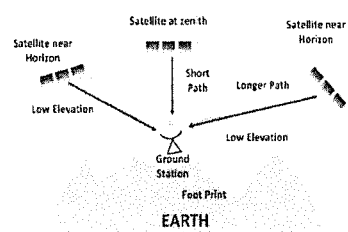
FIG. 56 illustrates an example embodiment that changes satellite orientation to maintain connectivity, according to one embodiment of the present invention.

To compensate this loss, the power of signal transmission or the satellite orientation should be changed to maintain good connectivity as shown in FIG. 56. But increase in power is not an option for a 3U Cubesat. An alternative solution to resolve this problem is to create an antenna design that resolves this problem.

Antenna Design

Figure 57:
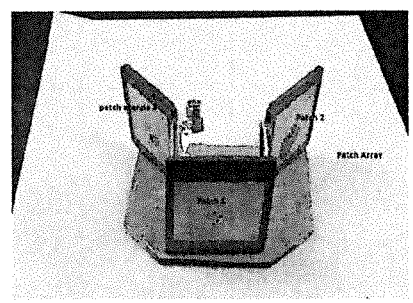
FIG. 57 illustrates an example non-coplanar S-band patch antenna, according to one embodiment of the present invention.

To overcome the issue of non-uniform gain and reduced coverage, a compact non-coplanar S-band switched beam patch antenna array with elements of different angular orientation is designed for 3U CubeSat form factor to improve the coverage and channel bandwidth (shown in FIG. 57).

Figure 58:
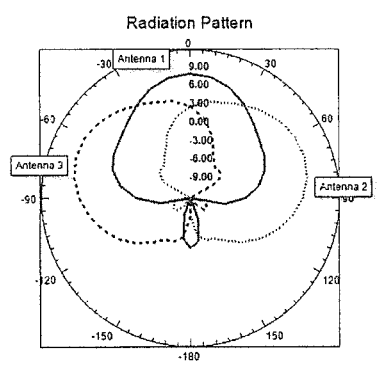
FIG. 58 illustrates a radiation pattern of a 3D patch antenna array, according to one embodiment of the present invention.

For a single satellite transmitter the antenna elements are selected using a diversity switch depending on orbital position of CubeSat with respect to the ground station. Each element of the array is a rectangular patch antenna that resonates at 2.25 GHz and has a −10 dB S11 bandwidth of 60 MHz along with a gain of 8 dB and a beam width of about 60°. Thus by switching between appropriate element a beam width of more than 150° can be attained and hence provide a longer connectivity to the ground station leading to increased data transfer. The antenna elements are developed on a 1.59 cm thick Roger 5880 substrate. The radiation pattern for each of the antennas as obtained from simulation in Ansoft HFSS is shown in FIG. 58.

Figure 59:
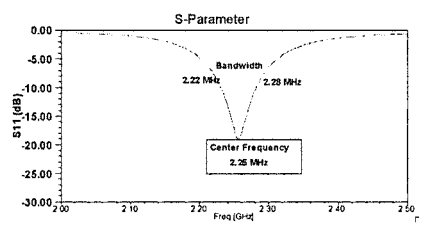
FIG. 59 illustrates an S-parameter of an example patch antenna, according to one embodiment of the present invention.
Figure 60:
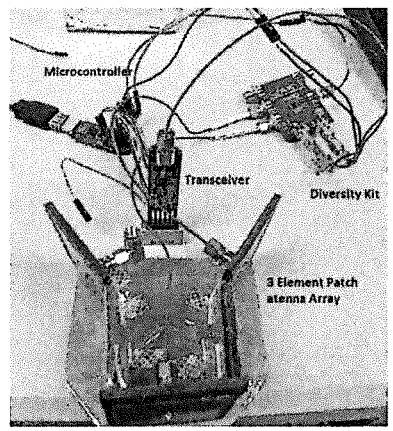
FIG. 60 shows an example beam switched array setup, according to one embodiment of the present invention.

The S-parameter for the antenna obtained from simulation is shown in FIG. 59. The antenna elements are selected using antenna switch kit connected to an S-band transceiver that is digitally controlled from a microcontroller based on orbital position of satellite. An example setup is shown in FIG. 60.

CONCLUSIONS

The constellation design and the resulting satellite requirements have been detailed above. By utilizing the AFId constellation fire detection can be accomplished with a 25 m spatial resolution and a revisit time of 30 minutes or less. This is an improvement over existing fire detection technologies. This could improve response time to natural disasters and ultimately lessen the destruction caused by wildfires. Launch and phasing of the AFiD constellation as a primary mission is feasible with existing technologies. However, small satellite propulsion systems are still in the experimental phase and no CubeSat to date has utilized onboard propulsion for altitude maintenance.

It was important to demonstrate that an entire CubeSat platform can be built for the purpose of fire detection. The structure of a CubeSat must maintain thermal stability and more importantly structural rigidity for the imaging system onboard. Given that a fire detection mission is dependent on imaging sensors the attitude determination and control system is incredibly important. It has been stated that commercial star trackers already exist to give precise attitude determination and the Space Systems Group's miniature CMG design will give precise pointing accuracy for attitude control.

The satellites have an average on-orbit power of 20 W which has been stated to be achievable via deployable solar panels and commercial battery boards.

A 3U CubeSat platform is a sufficient satellite form factor for a fractionated multi-spectral imaging mission. Via the fractionated approach, satellites can be retired, replaced or augments at a relatively low cost to the user. Furthermore, as the mission requirements evolve, the system can adapted to meet the new requirements, an impossibility with traditional monolithic satellites.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A satellite comprising a payload configured for transmitting data, the satellite comprising:
   a satellite body comprising a support structure configured to house the payload, the satellite body and the support structure are made at least in part of a conductive material;
   at least one deployable panel, the deployable panel secured to the support structure and at least a portion of the panel comprising a solar panel; and
   at least one reflector antenna coupled to the support structure, the reflector antenna comprising an antenna and a reflector, the reflector being embedded, at least in part, within a surface of the support structure, wherein:
the deployable panel is configured to cover the antenna in a non-deployed state and to expose the antenna in a deployed state,
the at least one deployable panel is configured to reflect a signal emitted by the antenna, and
a ground plane of the at least one deployable panel is a ground plane for the at least one reflector antenna.

2. The satellite according to claim 1, wherein the satellite is a pico- or nano-satellite.

3. The satellite according to claim 1, wherein the support structure is a 1U Cubesat.

4. The satellite according to claim 1, wherein the support structure is a 3U Cubesat.

5. The satellite according to claim 1, wherein the at least one antenna is an S-band antenna.

6. The satellite according to claim 1, wherein the antenna comprises a radiation monopole.

7. The satellite according to claim 6, wherein the monopole is disposed on an outer surface of the satellite body.

8. The satellite according to claim 1, wherein the reflector comprises a parabolic reflector.

9. The satellite according to claim 8, wherein the parabolic reflector is defined within the support structure, and wherein the at least one deployable panel is configured to cover the parabolic reflector in the non-deployed state.

10. The satellite according to claim 1, wherein the support structure comprises a plurality of deployable panels.

11. The satellite according to claim 1, wherein the plurality of deployable panels are disposed at an angle between 0-90 degrees with respect to a conductive surface of the satellite body.

12. The satellite according to claim 1, wherein the antenna is configured to provide a gain of at least 7 dBi and a bandwidth of at least 10 MHz.

13. The satellite according to claim 1, wherein the antenna is configured to provide a gain of at least 7 dBi and a bandwidth of at least 40 MHz.

14. The satellite according to claim 1, wherein the antenna is configured to provide a beam width of about 50-60 degrees.

15. The satellite according to claim 1, wherein the antenna is configured to provide a beam width between 0 and 90 degrees.

16. The satellite according to claim 1, wherein the support structure is an elongated cube shape.

17. The satellite according to claim 1, wherein the deployable panel is disposed substantially parallel to a ground plane of the support structure in the non-deployed state.

18. The satellite according to claim 17, wherein the deployable panel is disposed substantially perpendicular to the ground plane of the support structure in the deployed state.

19. The satellite according to claim 1, wherein the support structure comprises a plurality of sides, and wherein the at least one antenna is located at about the center of one of the sides.

20. The satellite according to claim 1, wherein the deployable panel is disposed substantially parallel to a ground plane of the support structure in the non-deployed state.

21. The satellite according to claim 1, wherein at least one deployable panel comprises a solar panel.

22. The satellite according to claim 1, wherein the antenna comprises an elastic material.

23. A satellite comprising a payload configured for transmitting data, the satellite comprising:
a satellite body comprising a support structure configured to house the payload, at least a portion of the satellite body and the support structure are made of a conductive material;
at least one deployable panel, the deployable panel secured to the support structure and at least part of the at least one deployable panel comprises a solar panel; and
at least one patch antenna coupled to the support structure such that a surface of the support structure is an extension of a ground plane of the at least one patch antenna,
wherein:
the deployable panel is configured to cover the patch antenna in a non-deployed state and to expose the patch antenna in a deployed state, and
the at least one deployable panel is configured to reflect a signal emitted by the patch antenna.

24. The satellite according to claim 23, wherein the at least one antenna comprises at least one annular ring patch antenna.

25. The satellite according to claim 23, wherein the at least one antenna comprises an array of patch antennas, wherein at least one antenna of the array of patch antennas is disposed on the at least one deployable panel.

26. The satellite according to claim 25, further comprising a diversity switch configured to switch between each of the patch antennas.

* * * * *

UNITED STATES PATENT AND TRADEMARK OFFICE
CERTIFICATE OF CORRECTION

PATENT NO. : 9,966,658 B2
APPLICATION NO. : 14/407396
DATED : May 8, 2018
INVENTOR(S) : Fitz-Coy et al.

Page 1 of 1

It is certified that error appears in the above-identified patent and that said Letters Patent is hereby corrected as shown below:

On the Title Page

Under the Abstract, please insert:
--25 Claims, 33 Drawing Sheets--

In the Claims

Please add:
--21. The satellite according to claim 1, wherein the antenna comprises an elastic material.

22. A satellite comprising a payload configured for transmitting data, the satellite comprising: a satellite body comprising a support structure configured to house the payload, at least a portion of the satellite body and the support structure are made of a conductive material; at least one deployable panel, the deployable panel secured to the support structure and at least part of the at least one deployable panel comprises a solar panel; and at least one patch antenna coupled to the support structure such that a surface of the support structure is an extension of a ground plane of the at least one patch antenna, wherein: the deployable panel is configured to cover the patch antenna in a non-deployed state and to expose the patch antenna in a deployed state, and the at least one deployable panel is configured to reflect a signal emitted by the patch antenna.

23. The satellite according to claim 22, wherein the at least one antenna comprises at least one annular ring patch antenna.

24. The satellite according to claim 22, wherein the at least one antenna comprises an array of patch antennas, wherein at least one antenna of the array of patch antennas is disposed on the at least one deployable panel.

25. The satellite according to claim 24, further comprising a diversity switch configured to switch between each of the patch antennas.--

Signed and Sealed this
Sixth Day of November, 2018

Andrei Iancu
*Director of the United States Patent and Trademark Office*